(12) United States Patent
Federighi et al.

(10) Patent No.: US 6,234,333 B1
(45) Date of Patent: May 22, 2001

(54) RECLOSABLE CONTAINER

(75) Inventors: Alberto Federighi, Viareggio; Antonio Fontana; Giovanni Ferrari, both of Carpi; Evro Fabbri, Novi di Modena, all of (IT)

(73) Assignees: Lameplast S.r.l., Rovereto di Novi; Farmigea S.p.A., Pisa, both of (IT)

( * ) Notice: Subject to any disclaimer, the term of this patent is extended or adjusted under 35 U.S.C. 154(b) by 0 days.

(21) Appl. No.: 09/214,024

(22) PCT Filed: Jun. 20, 1997

(86) PCT No.: PCT/EP97/03229

§ 371 Date: Jun. 14, 1999

§ 102(e) Date: Jun. 14, 1999

(87) PCT Pub. No.: WO97/49611

PCT Pub. Date: Dec. 31, 1997

(30) Foreign Application Priority Data

Jun. 27, 1996 (IT) ............................................. MO96A0085

(51) Int. Cl.[7] ...................................................... B65D 1/02
(52) U.S. Cl. .............................. 215/48; 215/50; 215/250; 215/355; 220/23.4; 222/456; 222/541.9
(58) Field of Search .................................. 215/48, 50, 51, 215/53, 250, 251, 355; 220/23.4, 266, 267; 222/456, 541.6, 541.9

(56) References Cited

U.S. PATENT DOCUMENTS

| | | | |
|---|---|---|---|
| 3,187,966 | * | 6/1965 | Klygis .................................... 222/541 |
| 4,410,096 | * | 10/1983 | Paradis .................................... 215/48 |
| 4,512,475 | * | 4/1985 | Federighi ............................... 206/484 |
| 4,790,453 | * | 12/1988 | Fontana et al. .................... 222/541 X |
| 4,951,822 | * | 8/1990 | Fontana et al. ........................ 206/530 |
| 5,577,636 | * | 11/1996 | Fukuoka et al. ............... 222/541.9 X |
| 5,897,009 | * | 4/1999 | O'Meara ................................ 215/48 |

FOREIGN PATENT DOCUMENTS

| | | | |
|---|---|---|---|
| 1757673 | * | 5/1971 | (DE) . |
| 1372433 | * | 8/1964 | (FR) . |
| 2223257 | * | 10/1974 | (FR) . |
| 2649676 | * | 1/1991 | (FR) . |
| 1465383 | * | 2/1977 | (GB) . |
| 2001275 | * | 1/1979 | (GB) . |
| WO 8301052 | * | 3/1983 | (WO) . |
| WO 9701493 | * | 1/1997 | (WO) . |

* cited by examiner

Primary Examiner—Stephen K. Cronin
(74) Attorney, Agent, or Firm—Guido Modiano; Albert Josif; Daniel O'Byrne

(57) ABSTRACT

The reclosable container (1), adapted to reduce the risk of contamination of the substance contained therein, comprises a hollow body (2) provided with a dispensing mouth (15) which can be plugged through respective detachable closure elements (4, 20, 23) which comprise plugs (6, 6b, 6c, 21, 21b, 25) which can be coupled to the mouth (15); the closure elements (4, 20, 23) are monolithic with the container (1); the plugs (6, 6b, 6c, 21, 21b, 25) are located on the closure elements (4, 20, 23) on the side thereof directed towards the mouth (15). The method comprises the formation of the closure elements (4, 20, 23) nonlithically with the container (1); during formation, the plugs (6, 6b, 6c, 21, 21b, 25) are formed on the closure elements (4, 20, 23) on the side of these elements which is directed towards the mouth (15); at the end of the formation, the plugs (6, 6b, 6c, 21, 21b, 25) are made to couple to the mouth (15). The container and method are used in the pharmaceutical, cosmetic, food industries, etcetera.

22 Claims, 24 Drawing Sheets

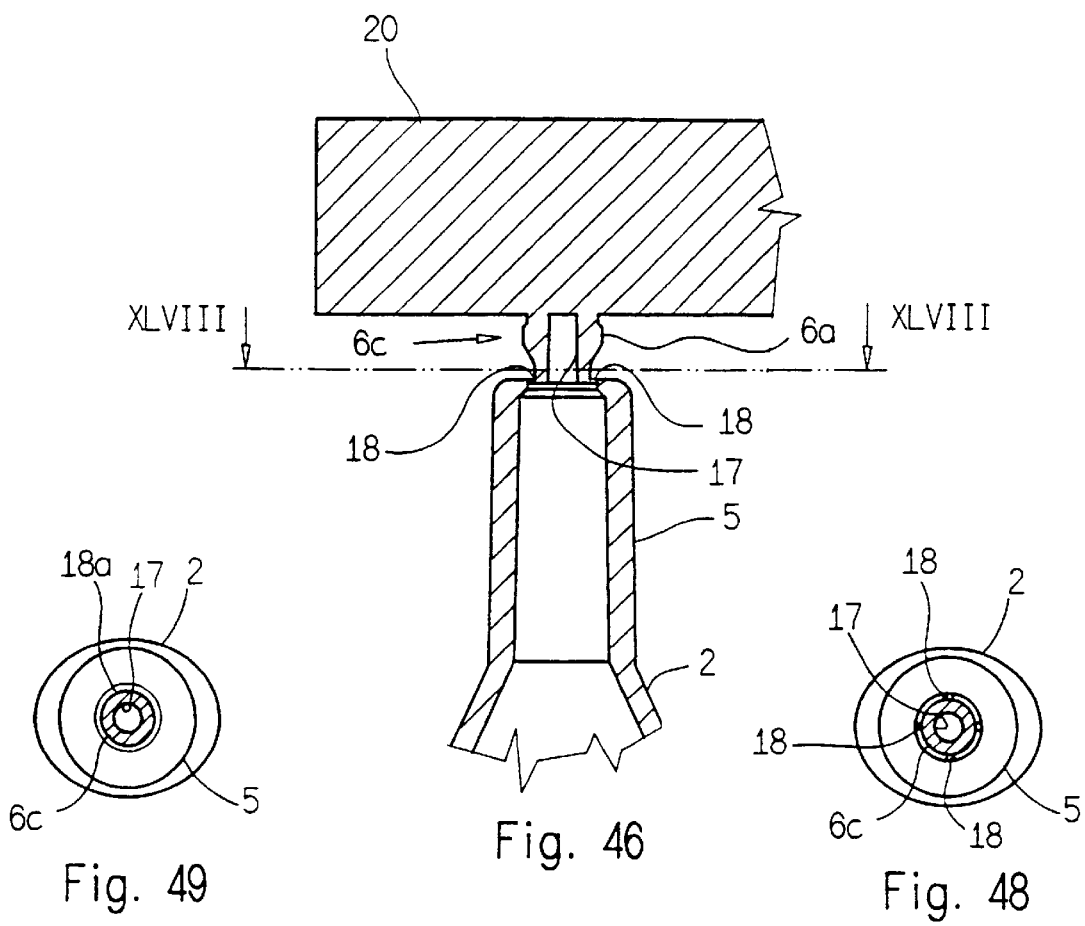
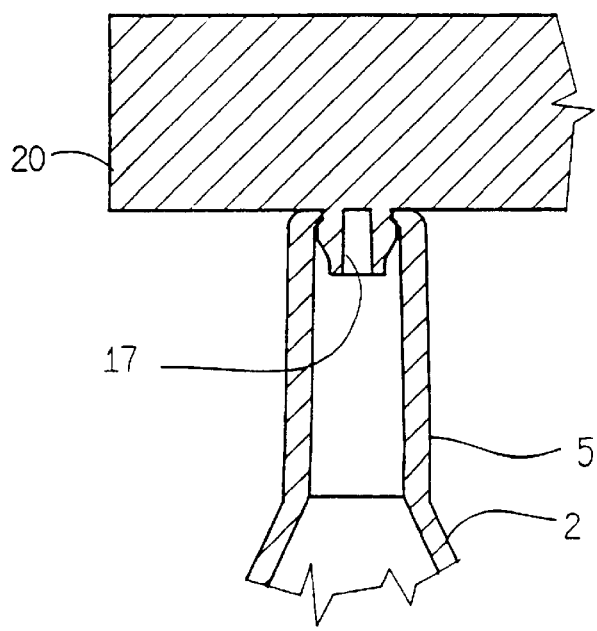

RECLOSABLE CONTAINER

TECHNICAL FIELD

The present invention relates to a reclosable container and to a corresponding manufacturing method, i.e., to a container for pharmaceutical, cosmetic or other products, manufactured for example by molding using plastic material fit for thermal bonding and provided with means allowing to reclose the container after use.

BACKGROUND ART

Conventional reclosable containers made of plastics, for pharmaceutical, cosmetic or other products are manufactured by blowing and/or molding in two parts: one of said parts is constituted by the body of the container, whilst the other part is constituted by closure means for keeping the container closed after its manufacture and to reclose it after use.

In these containers, the closure means remain inserted in the neck of the container or coupled thereto until it is opened for the first time for use. Accordingly, the part of the closure means which is in contact with the neck of the container is protected against external contaminants, which cannot deposit on it, and therefore the risk that said contaminants might be accidentally introduced in the container by said closure means when the container is reclosed after first use is minimized.

However, said containers are expensive to manufacture, since they require separate molds for the two parts of the container, which must furthermore be assembled after molding.

Conventional reclosable containers made of plastics, for pharmaceutical, cosmetic or other products are also produced by blowing and/or molding them monolithically; i.e., in these containers the body is formed monolithically with closure means which are adapted to keep the container closed after manufacture and/or to reclose it after use.

These containers are undoubtedly cheaper to manufacture than the previous ones, but they entail the drawback that the closure means must be formed on the outside of the container during molding; therefore, the part of said means that must be used to reclose the container after use remains exposed to external pollutants, which can thus easily enter the container when it is reclosed after first use, and this is particularly dangerous, for example in the case of pharmaceutical substances.

A container of this kind is the subject of Italian utility model patent no. 199776, which discloses a single- or multiple-dose container for pharmaceutical products which comprises a body provided with a lower opening, which can be sealed by thermal bonding, and with an upper neck, which is closed in an upward region by closure means in the form of a peduncle formed monolithically with said neck and with a stopper which is provided with plug means for reclosing the neck of the container after it has been opened by tearing the peduncle; the plug means are formed on the part of said stopper which is directed away from the neck of the container.

A molded container having already mounted the closure means, at the end of the molding operation, is known from the document GB-A-2 001 275.

This prior art is susceptible of considerable improvements as regards the possibility of eliminating the above drawbacks.

It is accordingly necessary to solve the problem of realizing a container which, after being opened, can be reclosed so as to minimize the risk of contaminating the substance contained therein and is as simple and cheap as possible to manufacture.

Another aspect of the problem is to realize a container which cannot be tampered with without leaving indications that tampering has occurred.

DISCLOSURE OF THE INVENTION

The invention solves the above problem by providing a container which comprises a hollow body provided with a dispensing mouth which can be plugged by respective detachable closure means comprising plug means which can be coupled to said mouth, said closure means being monolithic with the container, characterized in that said plug means are located on said closure means on the part of said closure means which is directed towards said mouth.

The closure means can be provided with tamper-evident means adapted to indicate whether the container has been opened and reclosed.

According to another aspect of the present invention, the above technical problem is solved by adopting a method for manufacturing containers comprising the formation of a hollow body provided with a dispensing mouth which can be plugged through respective detachable closure means comprising plug means which can be coupled to said mouth, said closure means being formed monolithically with the container, characterized in that during said formation said plug means are provided on said closure means on the side thereof which is directed towards said mouth and in that at the end of said formation said plug means are coupled to said mouth.

The advantages achieved by the present invention are: a drastic reduction of the risk of contaminating the substance contained in the container when said container is reclosed after use; the possibility to simply and evidently indicate any tampering with the container; simple manufacture; and easy use.

BRIEF DESCRIPTION OF THE DRAWINGS

Some embodiments of the invention are illustrated, merely by way of example, in the accompanying drawings, wherein:

FIG. 46 is an enlarged-scale sectional view of a detail of a container of FIG. 43 before the insertion of the plug means in the mouth of the container;

FIG. 47 is an enlarged-scale sectional view of a detail similar to the one of FIG. 46, but with the plug means inserted in the mouth of the container;

FIG. 48 is a sectional view, taken along the plane XLVIII—XLVIII of FIG. 46;

FIG. 49 is a sectional view, similar to FIG. 48, but related to a different embodiment of the container of FIG. 46;

WAYS OF CARRYING OUT THE INVENTION

Figure 1:
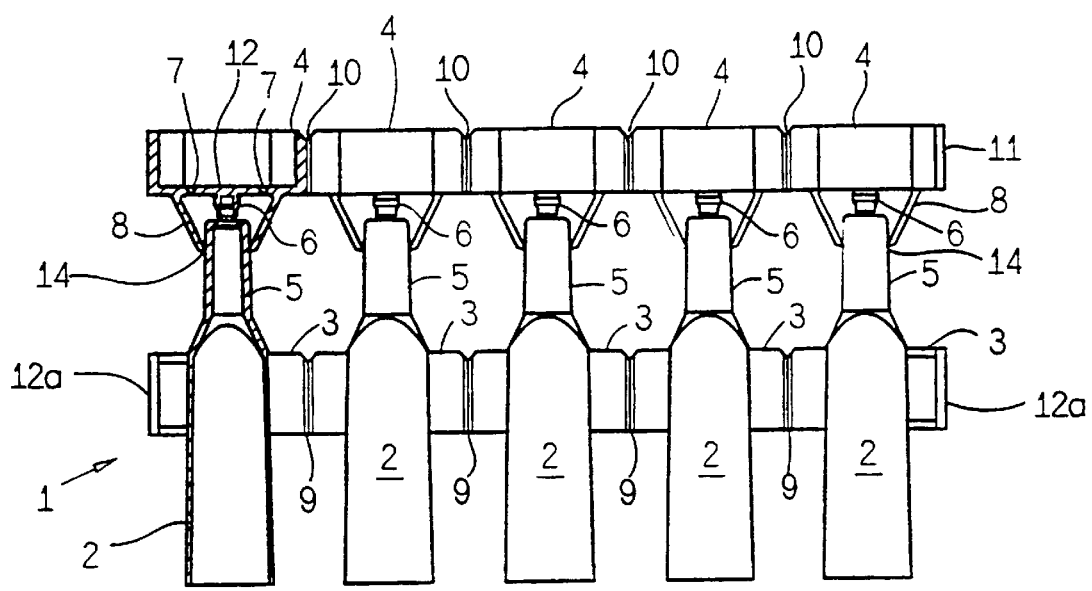
FIG. 1 is a partially sectional view of a plurality of containers according to a first embodiment of the present invention, for example a pack of containers in the form of vials, before the insertion of the plug means in the respective mouths of the containers.
Figure 2:
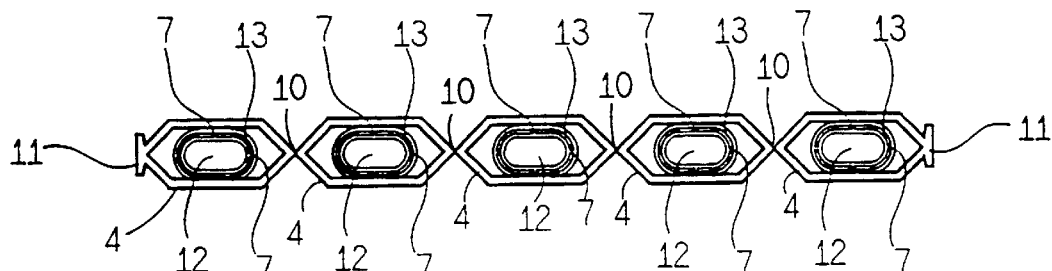
FIG. 2 is a top view of FIG. 1.
Figure 3:
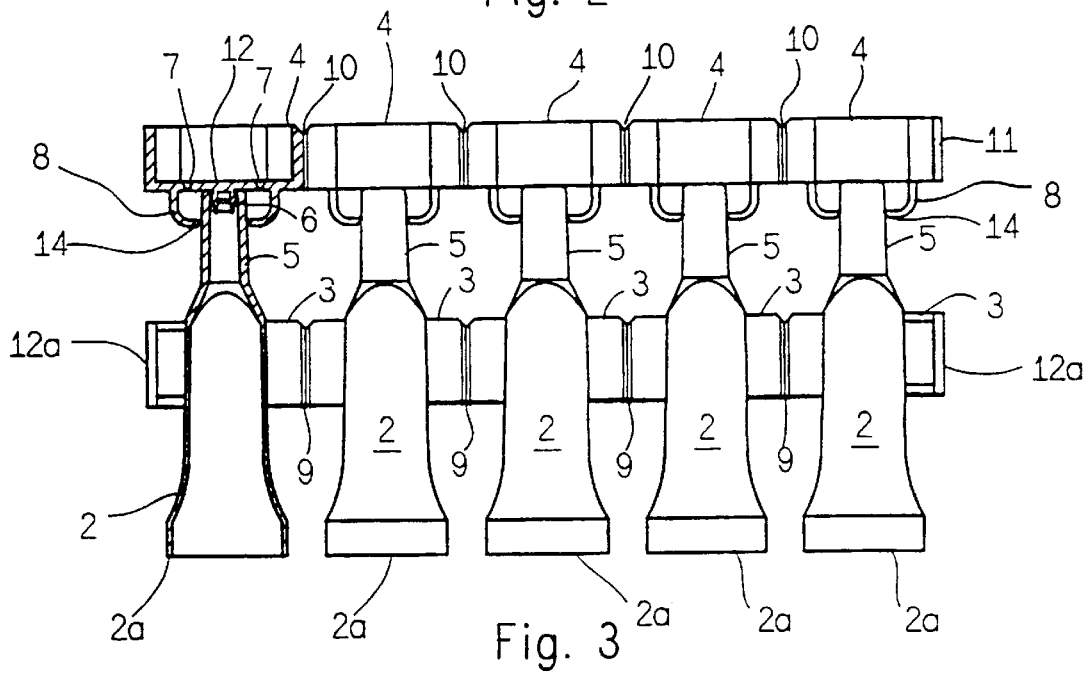
FIG. 3 is a view, similar to FIG. 1, in which the plug means are inserted in the respective mouths of the containers.
Figure 4:
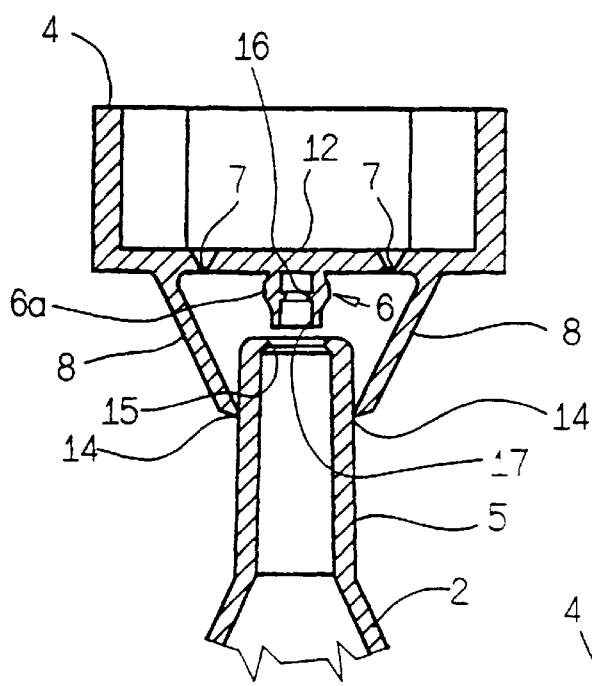
FIG. 4 is an enlarged-scale sectional view of a detail of a container of FIG. 1 before the insertion of the plug means in the mouth of the container.
Figure 5:
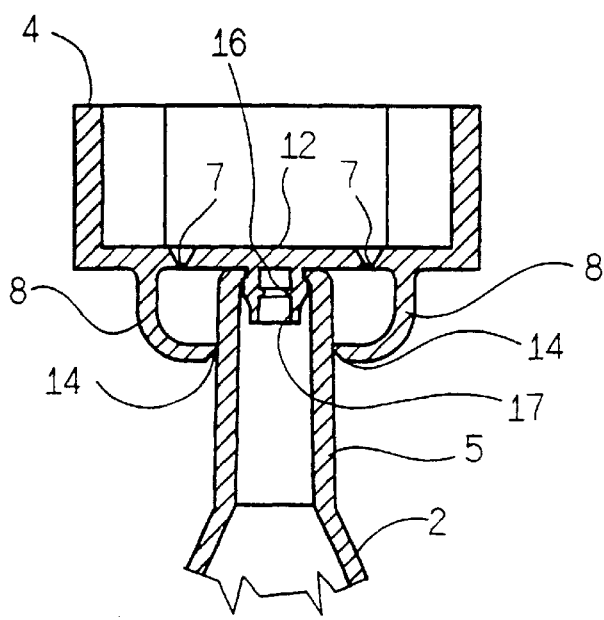
FIG. 5 is an enlarged-scale sectional view of a detail similar to the one of FIG. 4, but with the plug means inserted in the mouth of the container.
Figure 6:
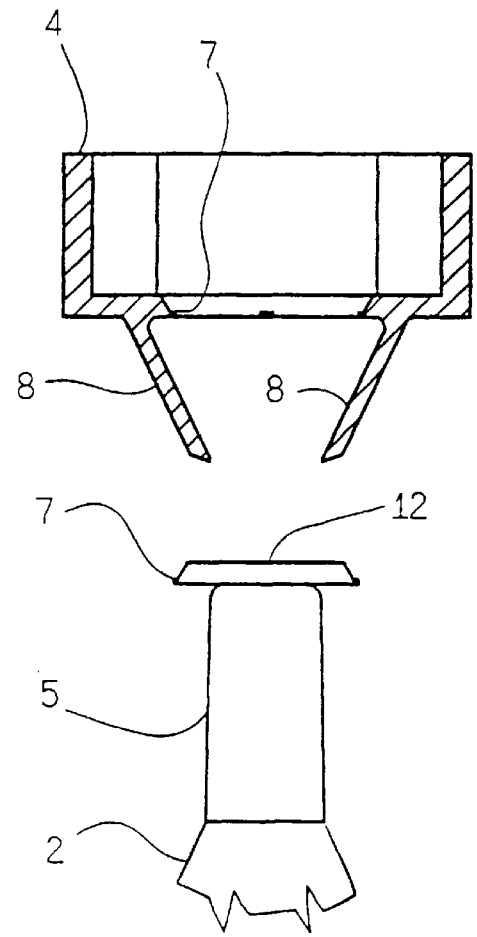
FIG. 6 is an enlarged-scale but nonsectional view of a detail, similar to the one of FIG. 5, for illustrating the operation for opening the container.
Figure 7:
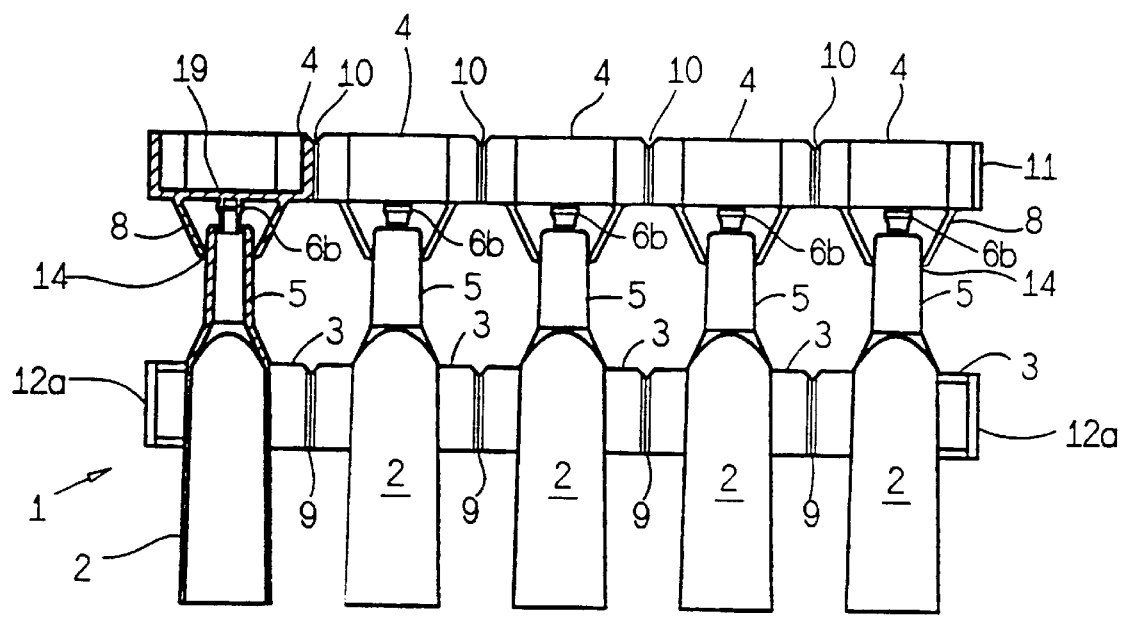
FIG. 7 is a partially sectional view of a plurality of containers according to a second embodiment of the present invention, for example a pack of containers in the form of vials, before the insertion of the plug means in the respective mouths of the containers.
Figure 8:
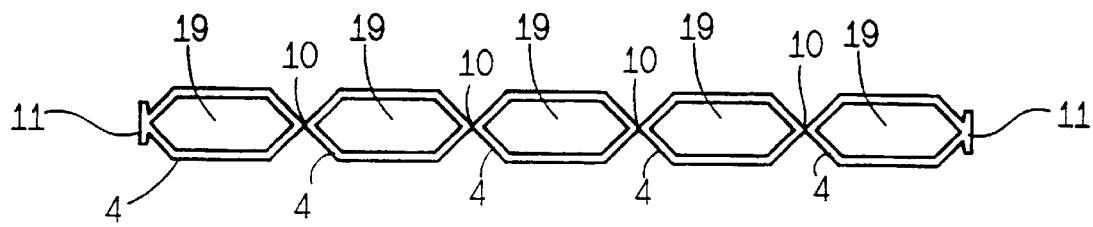
FIG. 8 is a top view of FIG. 7.
Figure 9:
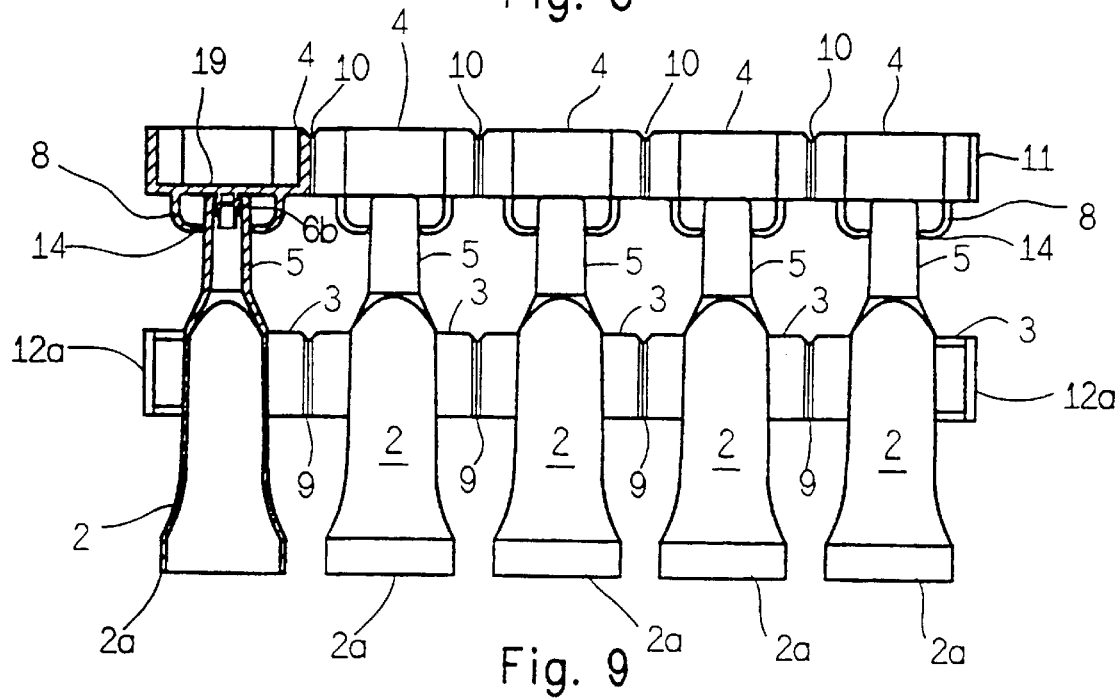
FIG. 9 is a view, similar to FIG. 7, in which the plug means are inserted in the respective mouths of the containers.
Figure 10:
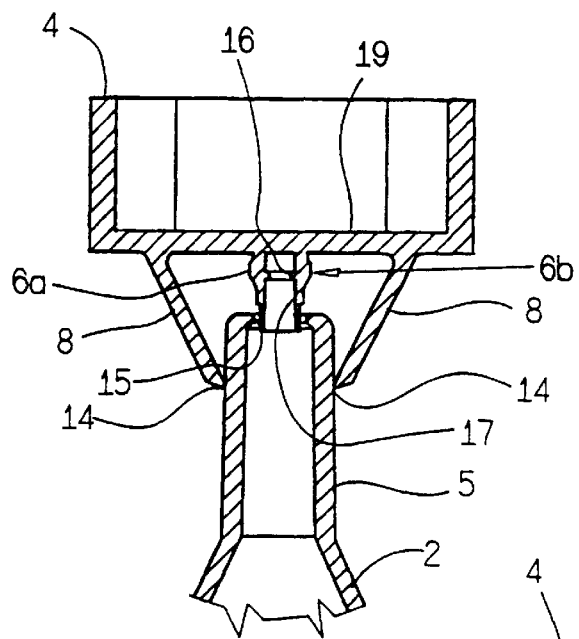
FIG. 10 is an enlarged-scale sectional view of a detail of a container of FIG. 7 before the insertion of the plug means in the mouth of the container.
Figure 11:
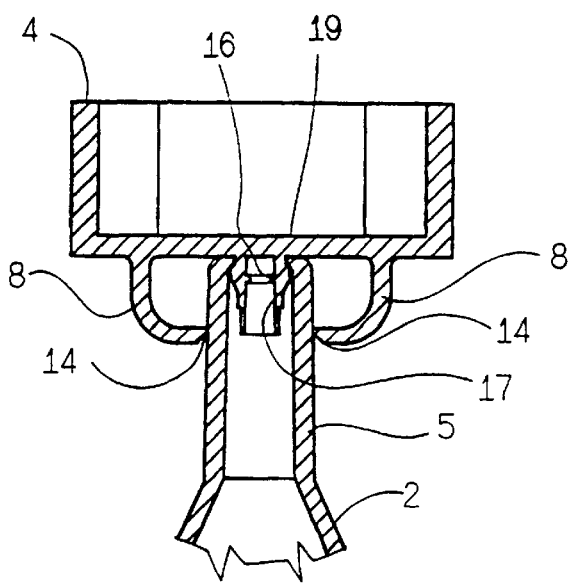
FIG. 11 is an enlarged-scale sectional view of a detail similar to the one of FIG. 10, but with the plug means inserted in the mouth of the container.
Figure 12:
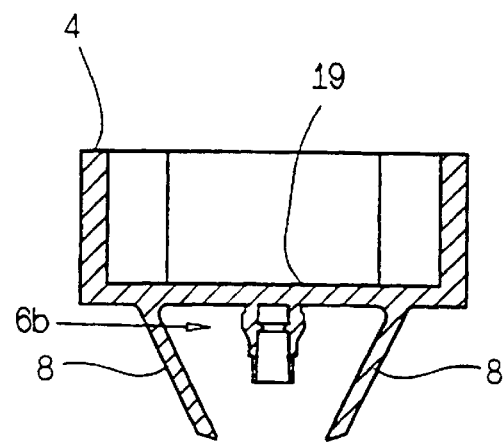
FIG. 12 is an enlarged-scale but nonsectional view of a detail similar to the one of FIG. 11, illustrating the operation for opening the container.
Figure 13:
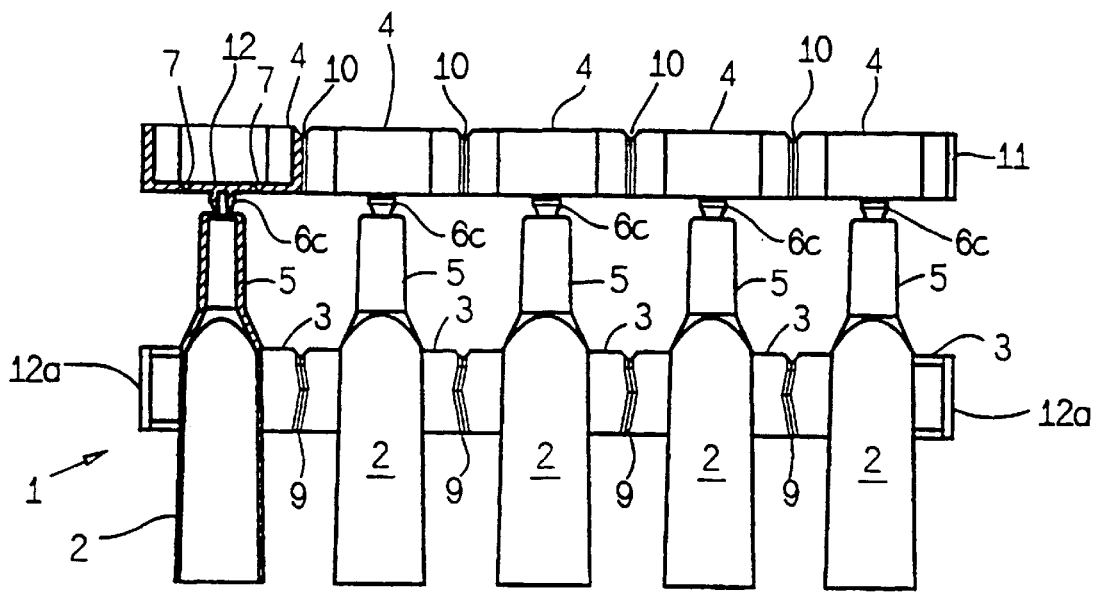
FIG. 13 is a partially sectional view of a plurality of containers according to a third embodiment of the present invention, for example a pack of containers in the form of vials, before the insertion of the plug means in the respective mouths of the containers.
Figure 14:
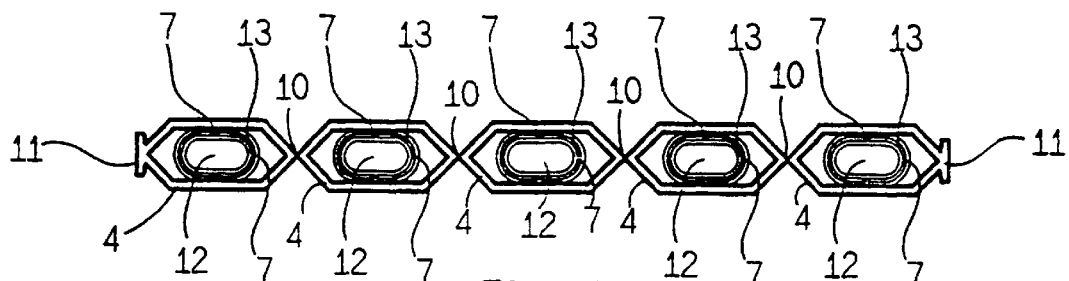
FIG. 14 is a top view of FIG. 13.
Figure 15:
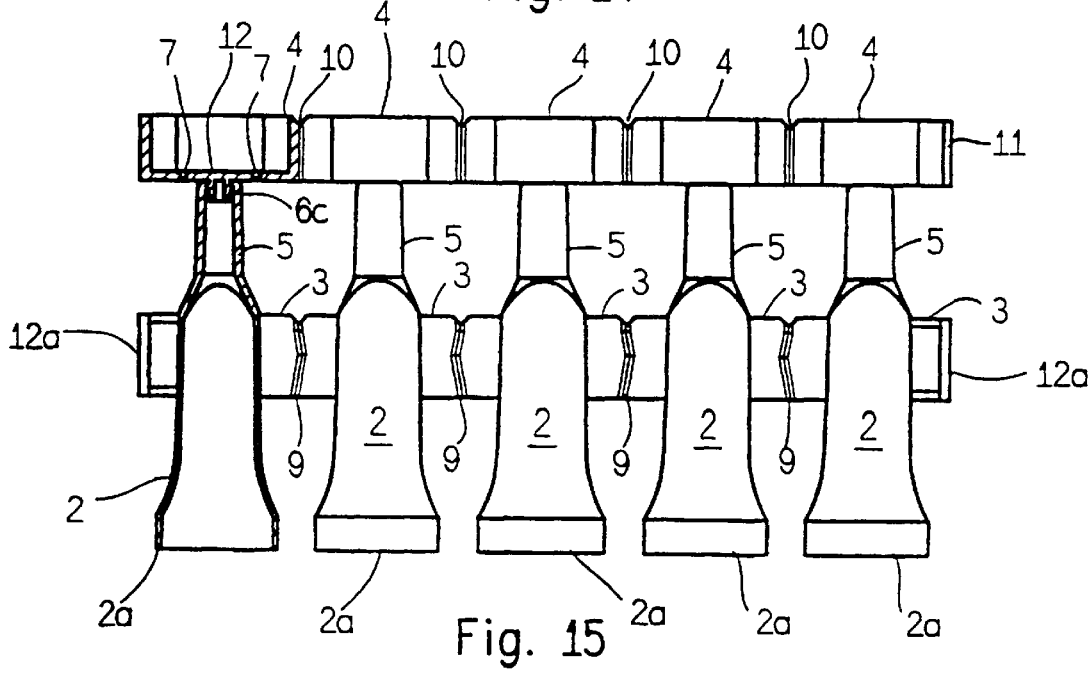
FIG. 15 is a view, similar to FIG. 13, in which the plug means are inserted in the respective mouths of the containers.
Figure 16:
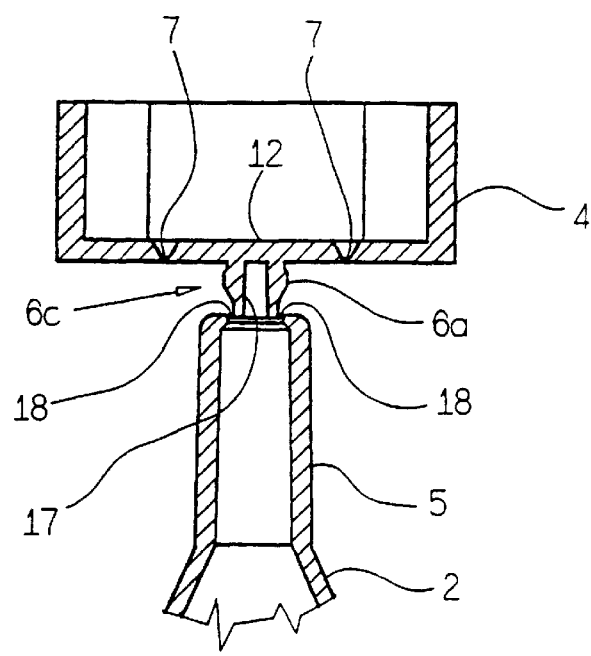
FIG. 16 is an enlarged-scale sectional view of a detail of a container of FIG. 13 before the insertion of the plug means in he mouth of the container.
Figure 17:
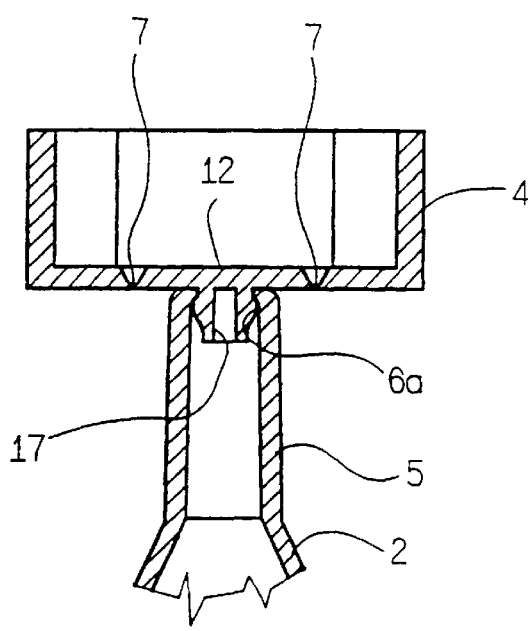
FIG. 17 is an enlarged-scale sectional view of a detail similar to the one of FIG. 16, but with the plug means inserted in the mouth of the container.
Figure 18:
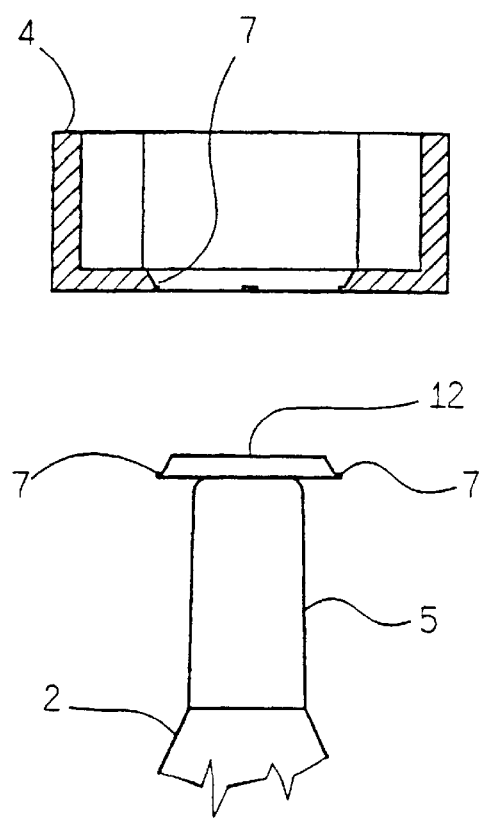
FIG. 18 is an enlarged-scale but nonsectional view of a detail similar to the one of FIG. 17, illustrating the operation for opening the container.
Figure 19:
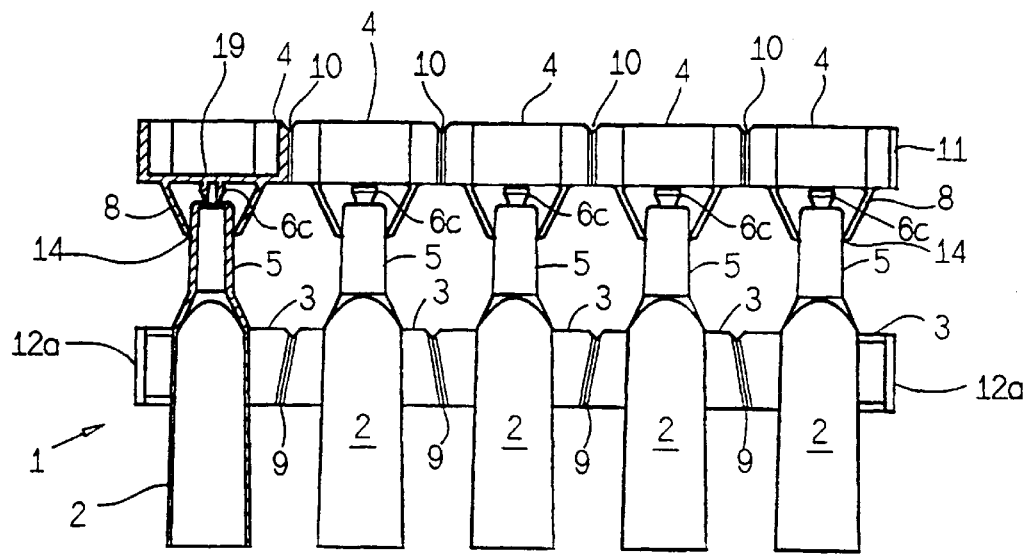
FIG. 19 is a partially sectional view of a plurality of containers according to a fourth embodiment of the present invention, for example a pack of containers in the form of vials, before the insertion of the plug means in the respective mouths of the containers.
Figure 20:
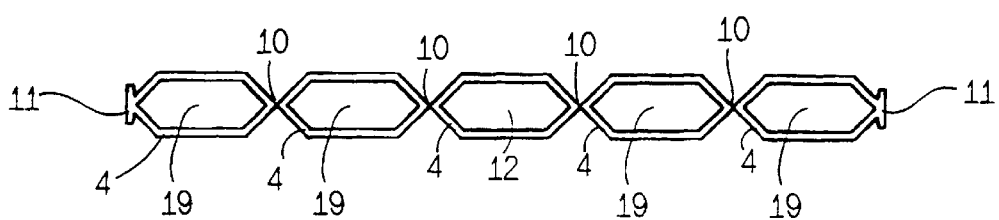
FIG. 20 is a top view of FIG. 19.
Figure 21:
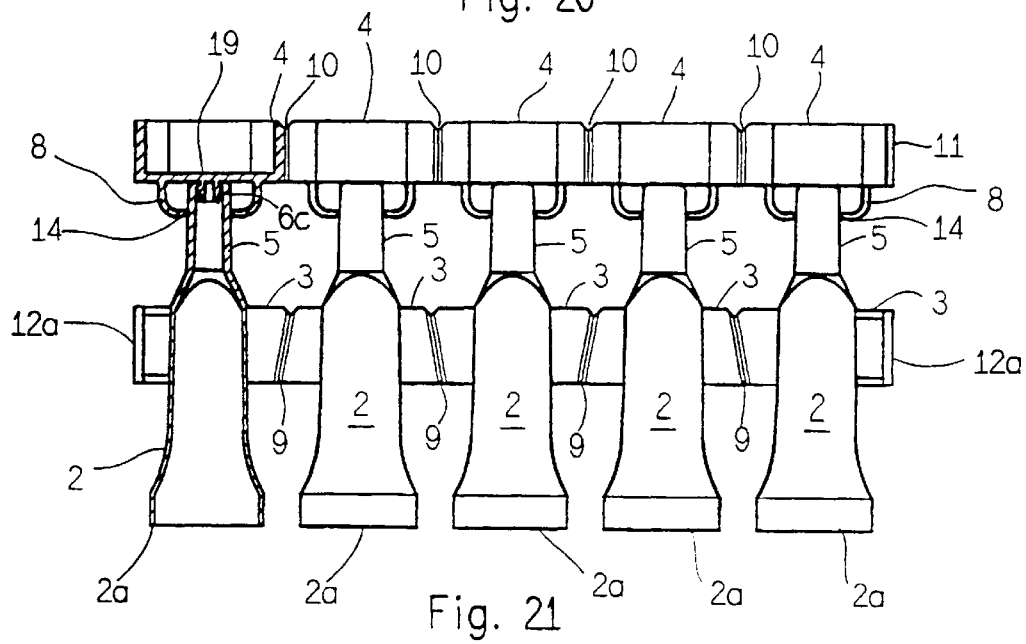
FIG. 21 is a view, similar to FIG. 19, in which the plug means are inserted in the respective mouths of the containers.
Figure 22:
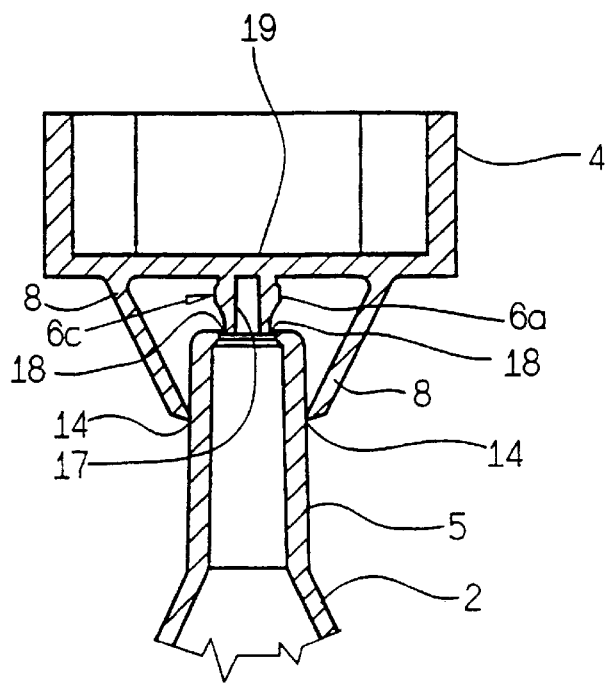
FIG. 22 is an enlarged-scale sectional view of a detail of a container of FIG. 19 before the insertion of the plug means in the mouth of the container.
Figure 23:
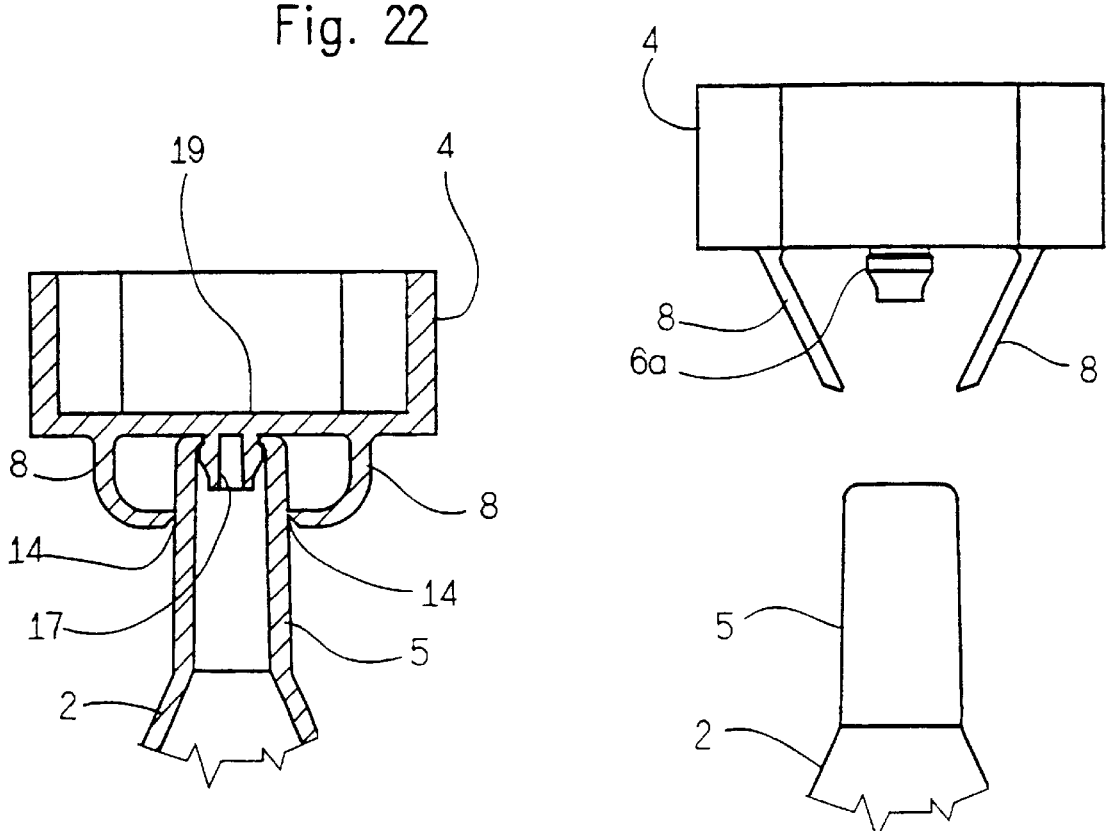
FIG. 23 is an enlarged-scale sectional view of a detail similar to the one of FIG. 22, but with the plug means inserted in the mouth of the container.
Figure 24:
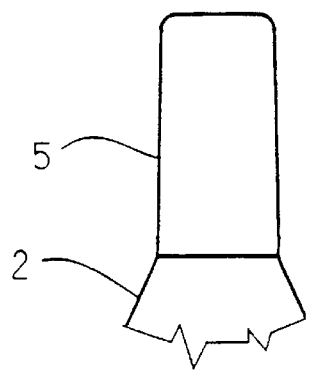
FIG. 24 is an enlarged-scale but nonsectional view of a detail similar to the one of FIG. 23, for illustrating the operation for opening the container.
Figure 25:
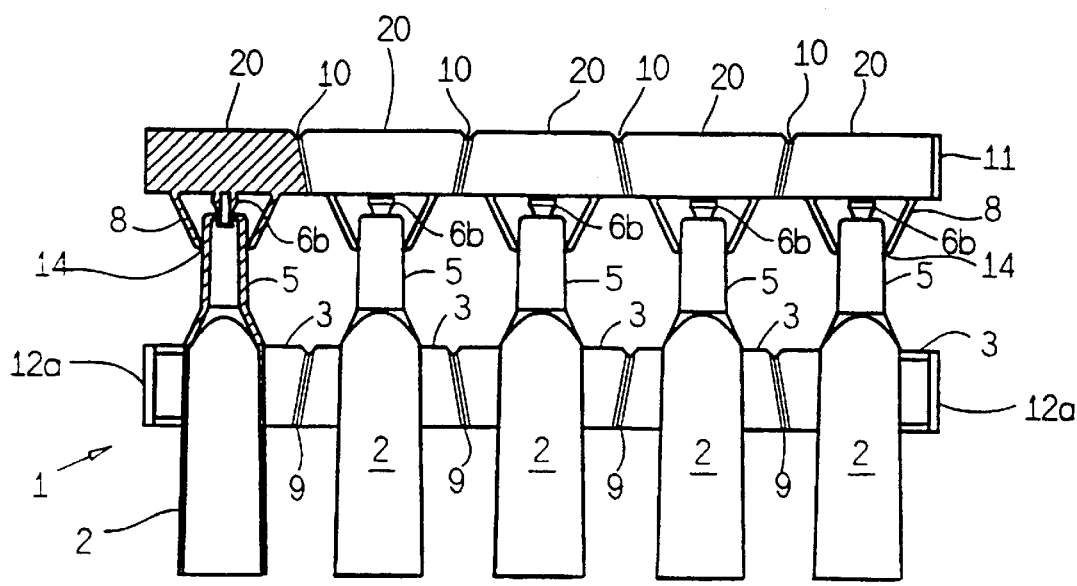
FIG. 25 is a partially sectional view of a plurality of containers according to a fifth embodiment of the present invention, for example a pack of containers in the form of vials, before the insertion of the plug means in the respective mouths of the containers.
Figure 26:
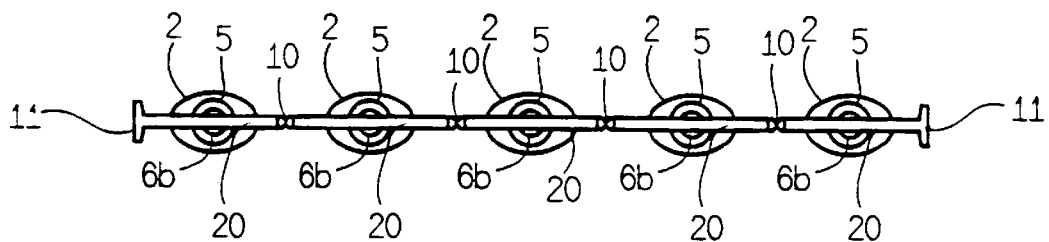
FIG. 26 is a top view of FIG. 25.
Figure 27:
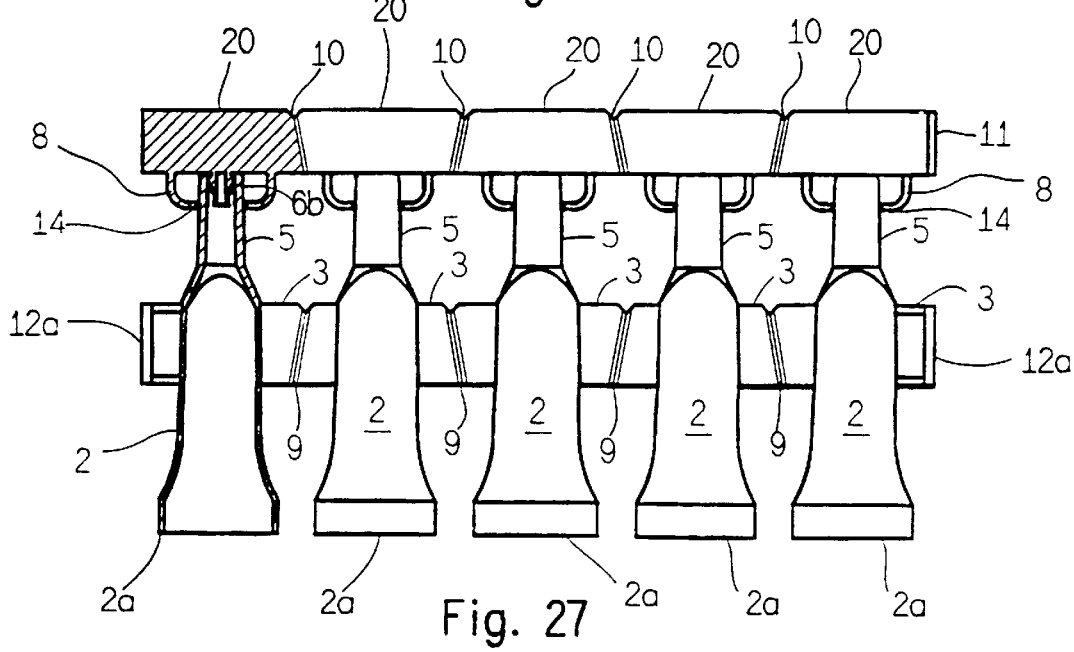
FIG. 27 is a view, similar to FIG. 25, in which the plug means are inserted in the respective mouths of the containers.
Figure 28:
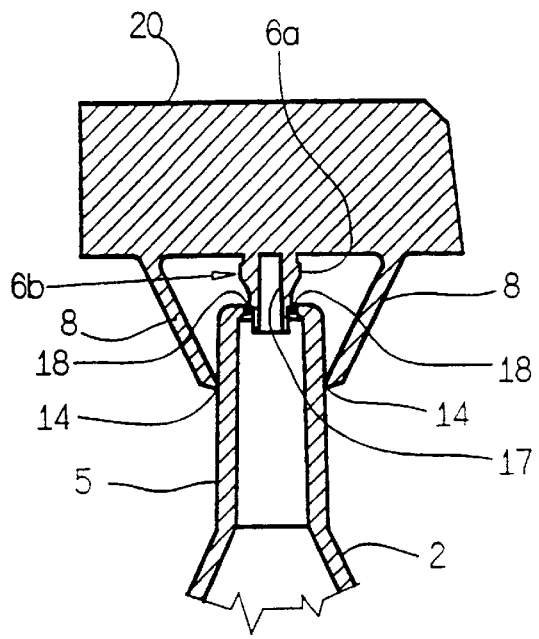
FIG. 28 is an enlarged-scale sectional view of a container of FIG. 25 before the insertion of the plug means in the mouth of the container.
Figure 29:
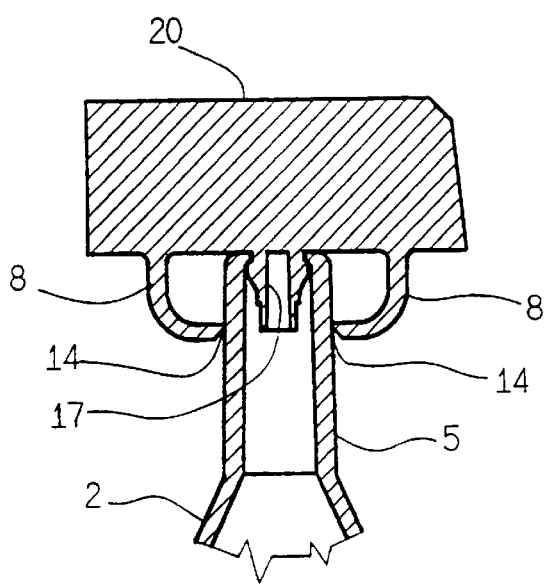
FIG. 29 is an enlarged-scale sectional view of a detail similar to the one of FIG. 28, but with the plug means inserted in the mouth of the container.
Figure 30:
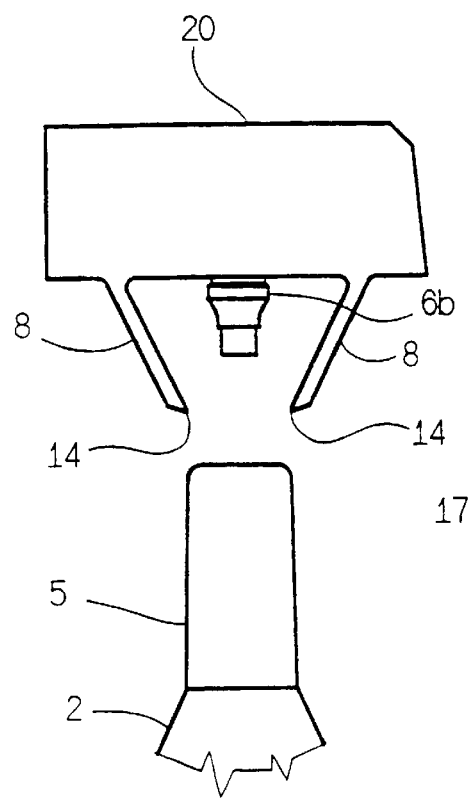
FIG. 30 is an enlarged-scale but nonsectional view of a detail similar to the one of FIG. 29, for illustrating the operation for opening the container.
Figure 31:
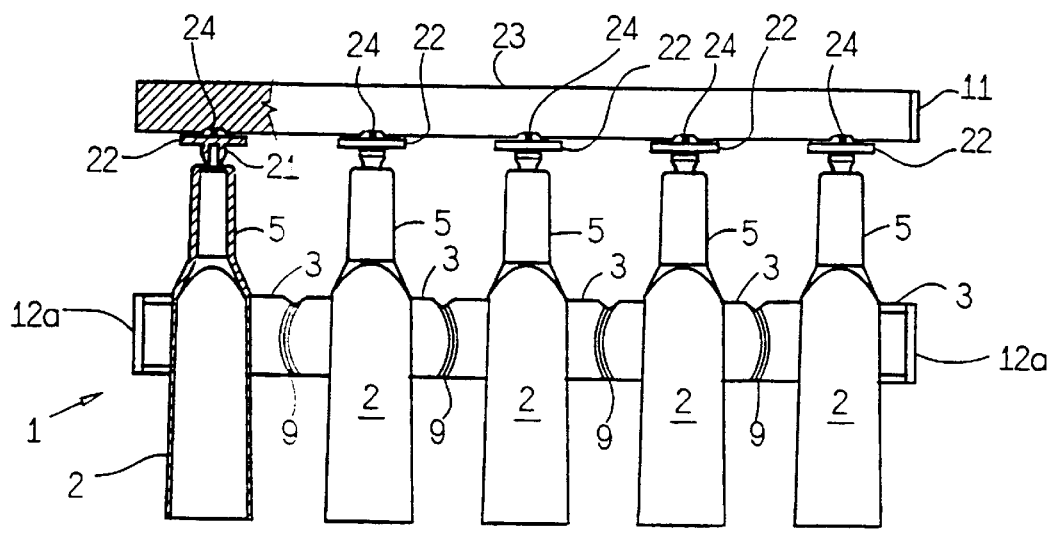
FIG. 31 is a partially sectional view of a plurality of containers according to a sixth embodiment of the present invention, for example a pack of containers in the form of vials, before the insertion of the plug means in the respective mouths of the containers.
Figure 32:
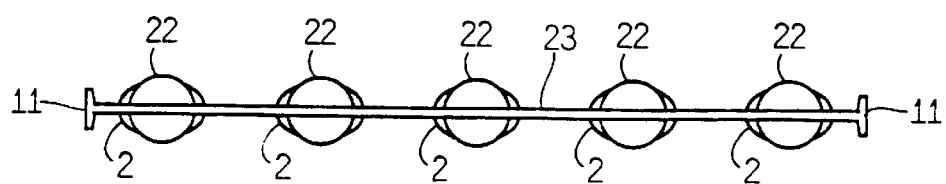
FIG. 32 is a top view of FIG. 31.
Figure 33:
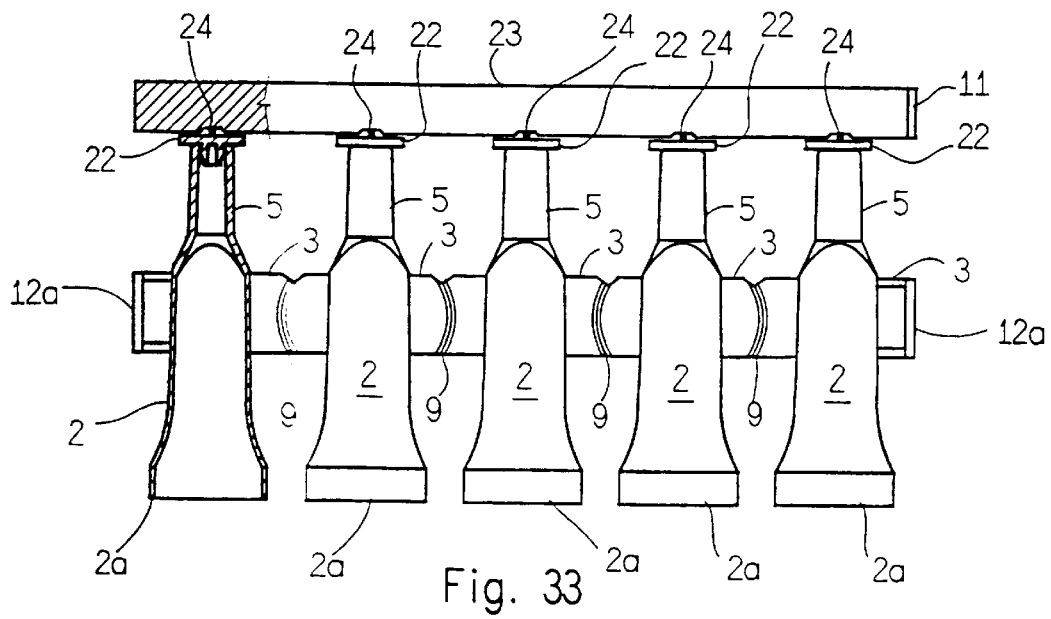
FIG. 33 is a view similar to the one of FIG. 31 and in which the plug means are inserted in the respective mouths of the containers.
Figure 34:
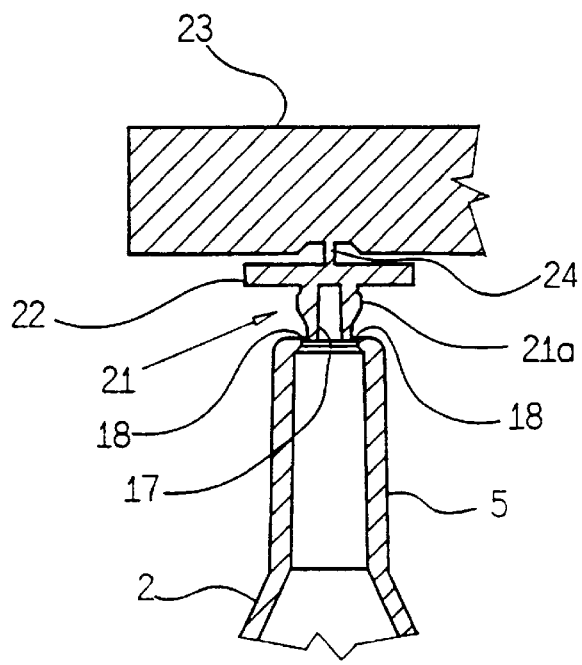
FIG. 34 is an enlarged-scale sectional view of a detail of a container of FIG. 31 before the insertion the plug means in the mouth of the container.
Figure 35:
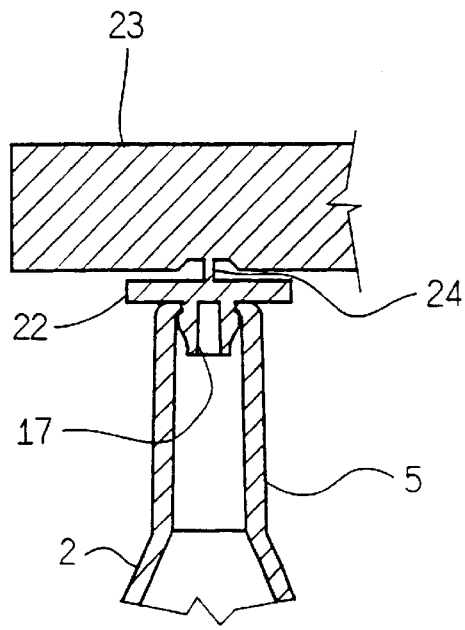
FIG. 35 is an enlarged-scale sectional view of a detail, similar to the one of FIG. 34, but with the plug means inserted in the mouth of the container.
Figure 36:
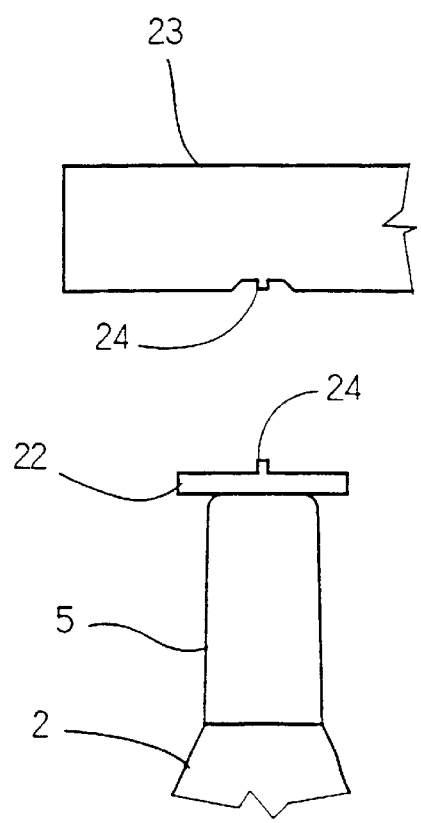
FIG. 36 is an enlarged-scale but nonsectional view of a detail, similar to the one of FIG. 35, illustrating the operation for opening the container.
Figure 37:
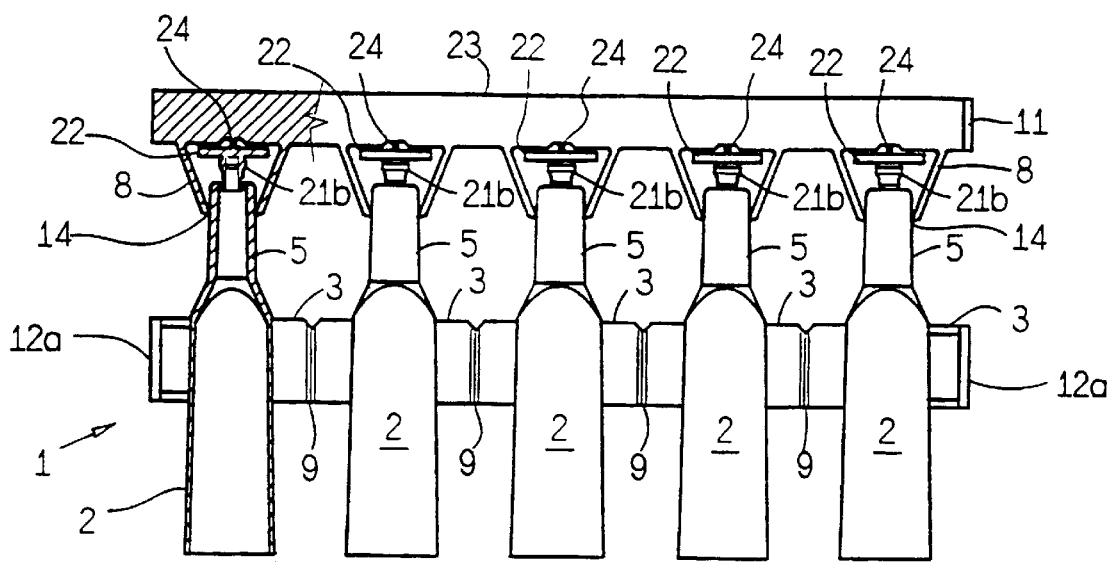
FIG. 37 is a partially sectional view of a plurality of containers according to a seventh embodiment of the present invention, for example a pack of containers in the form of vials, before the insertion of the plug means in the respective mouths of the containers.
Figure 38:
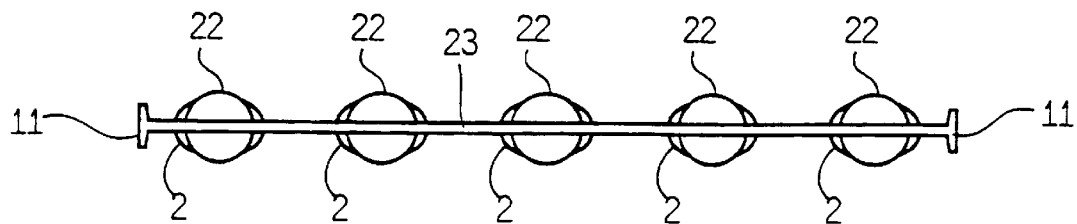
FIG. 38 is a top view of FIG. 37.
Figure 39:
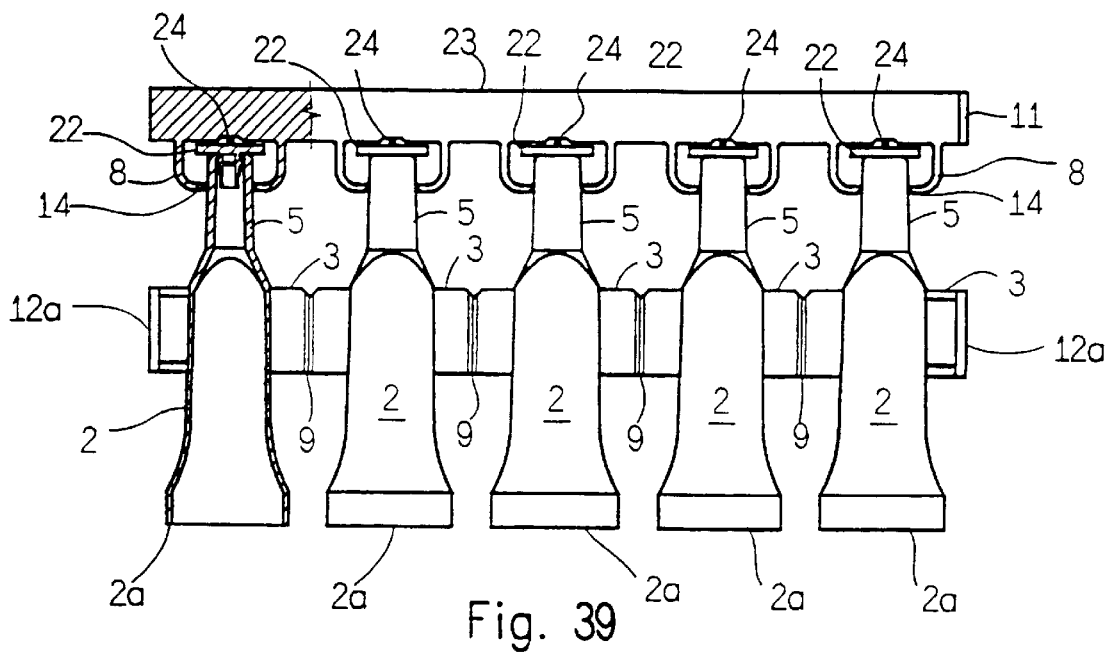
FIG. 39 is a view, similar to the one of FIG. 37, in which the plug means are inserted in the respective mouths of the containers.
Figure 40:
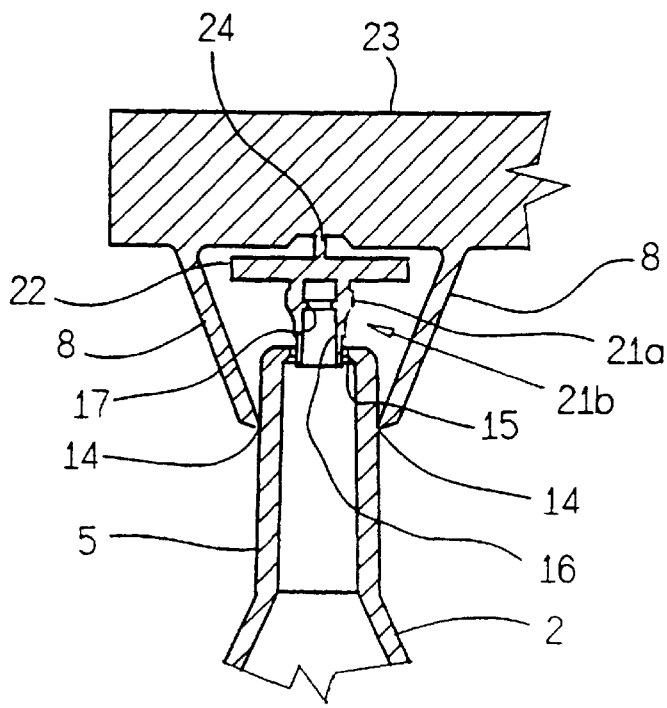
FIG. 40 is an enlarged-scale sectional view of a detail of a container of FIG. 37, before the insertion of the plug means in the mouth of the container.
Figure 41:
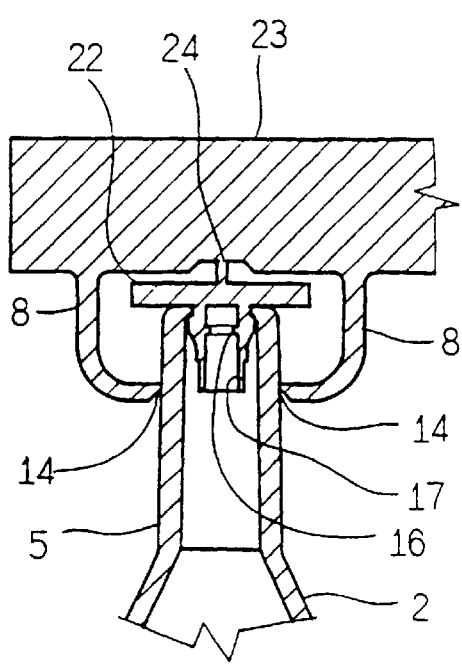
FIG. 41 is an enlarged-scale sectional view of a detail, similar to the one of FIG. 40, but with the plug means inserted in the mouth of the container.
Figure 42:
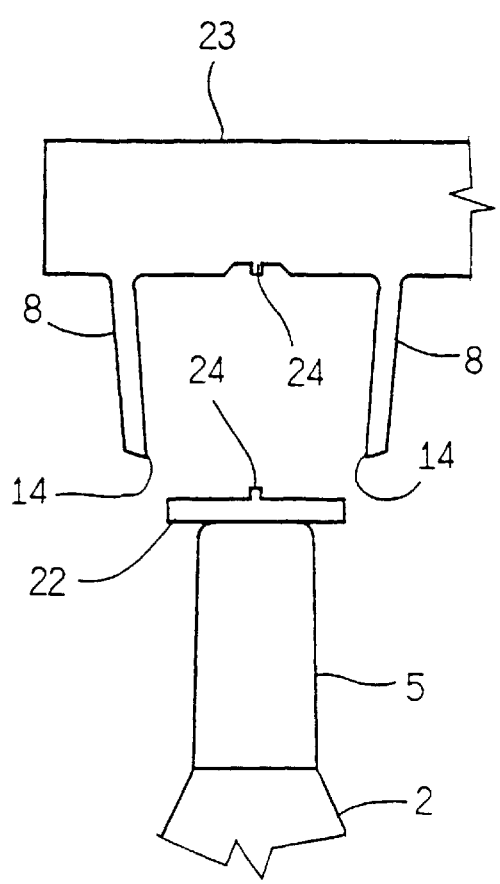
FIG. 42 is an enlarged-scale but nonsectional view of a detail, similar to the one of FIG. 40, illustrating the operation for opening the container.
Figure 43:
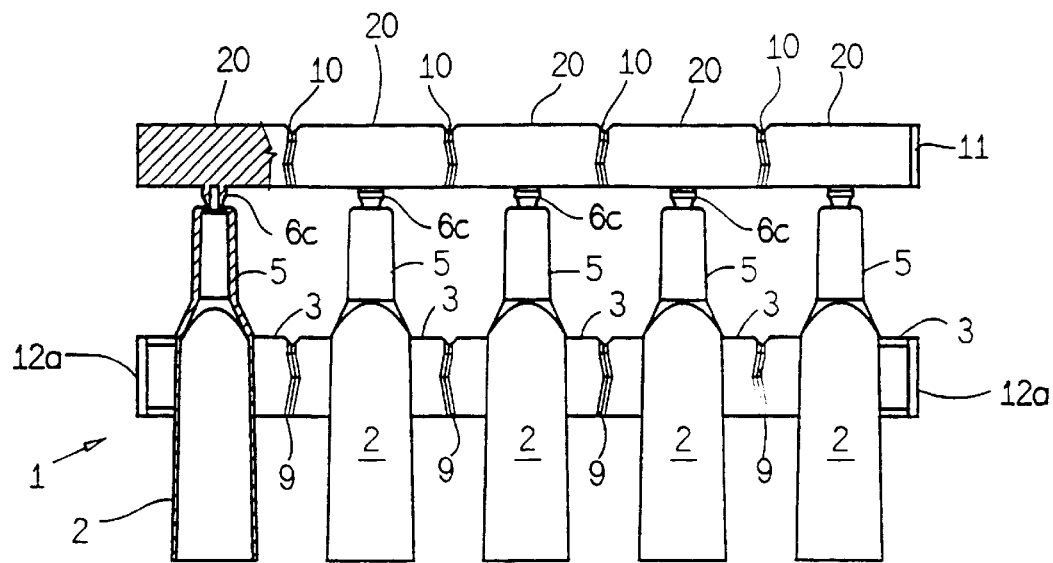
FIG. 43 is a partially sectional view of a plurality of containers according to an eighth embodiment of the present invention, for example a pack of containers in the form of vials, before the insertion of the plug means in the respective mouths of the containers.
Figure 44:
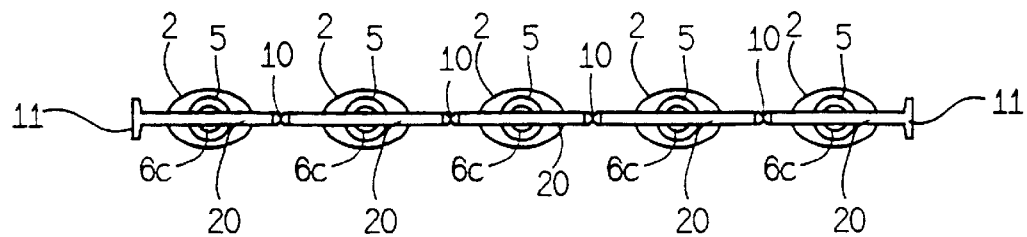
FIG. 44 is a top view of FIG. 43.
Figure 45:
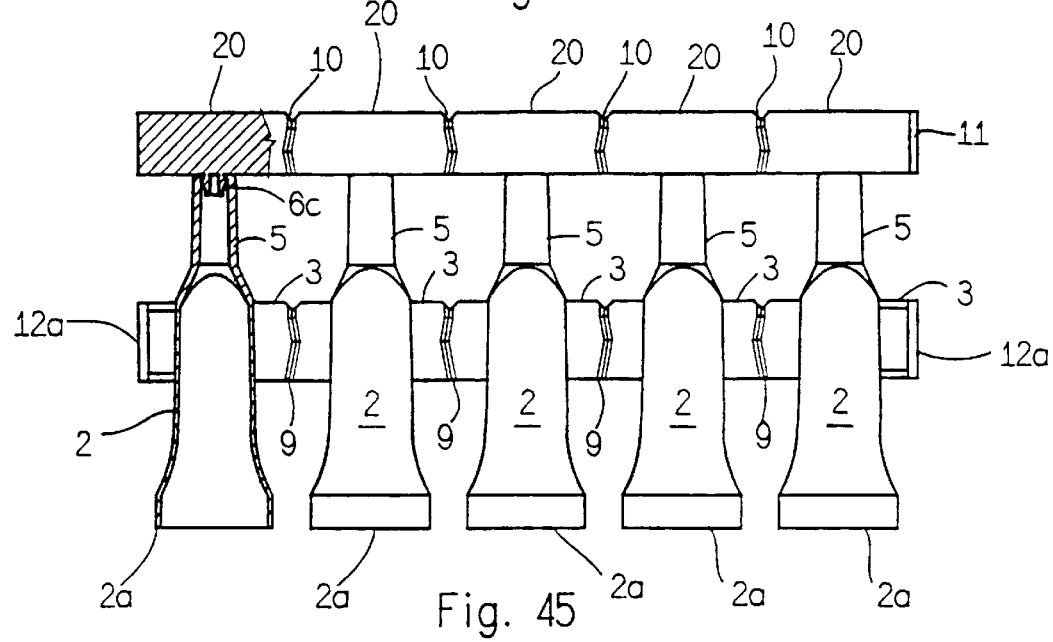
FIG. 45 is a view, similar to FIG. 43, in which the plug means are inserted in the respective mouths of the containers.
Figure 50:
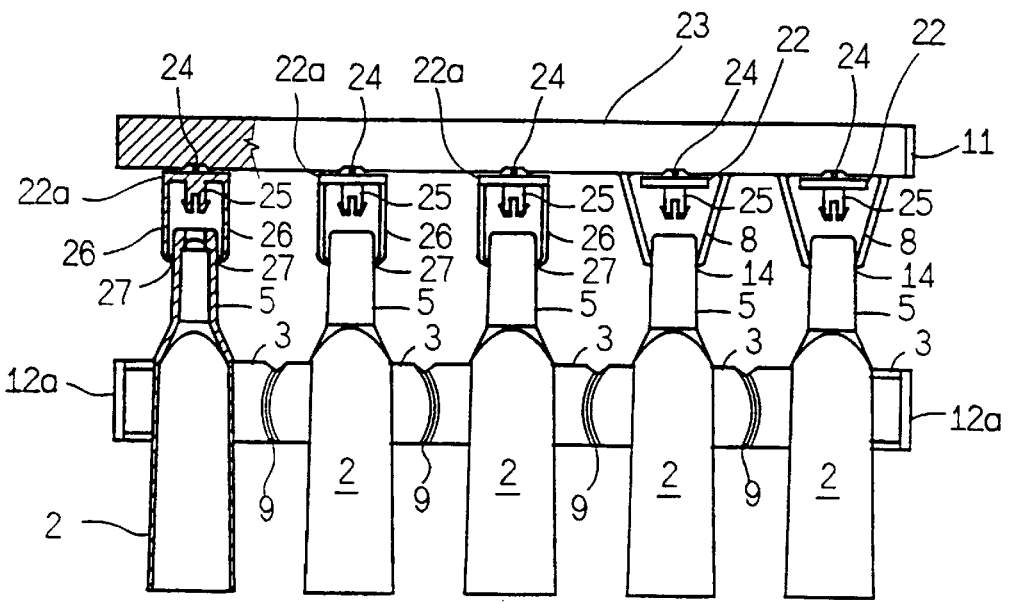
FIG. 50 is a partially sectional view; of a plurality of containers according to a ninth embodiment of the present invention, for example a pack of containers in the form of vials, before the insertion of the plug means in the respective mouths of the containers, the right portion of the figure illustrating a different embodiment of said ninth version.
Figure 51:
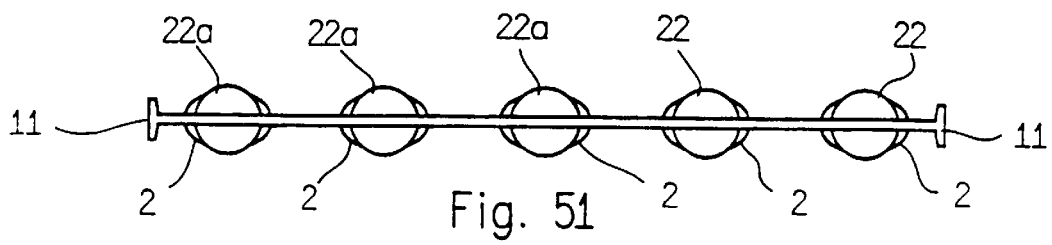
FIG. 51 is a top view of FIG. 50.
Figure 52:
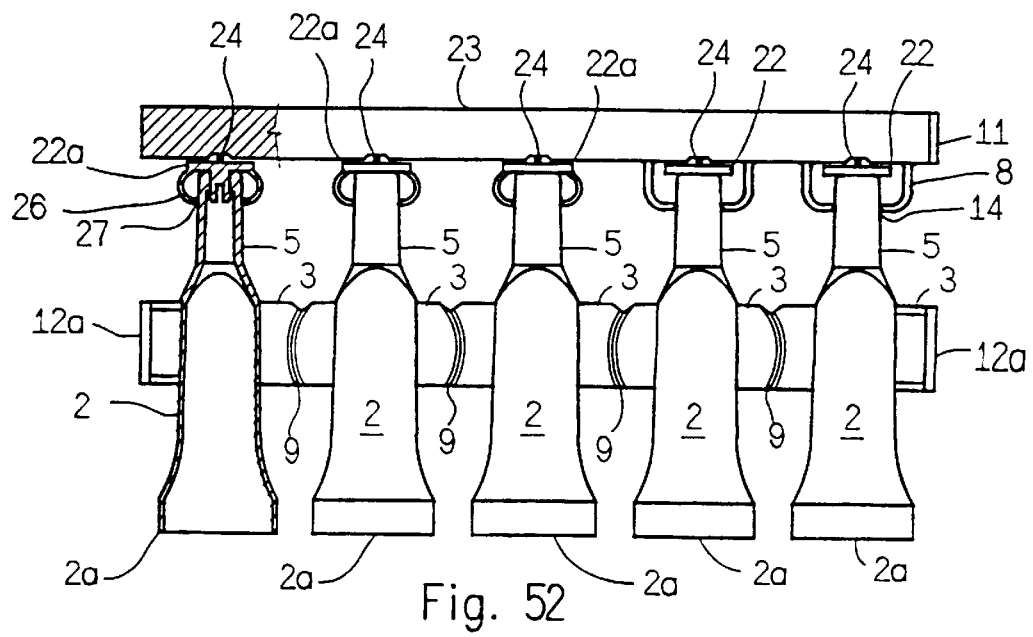
FIG. 52 is a view, similar to FIG. 50, in which the plug means are inserted in the respective mouths of the containers.
Figure 53:
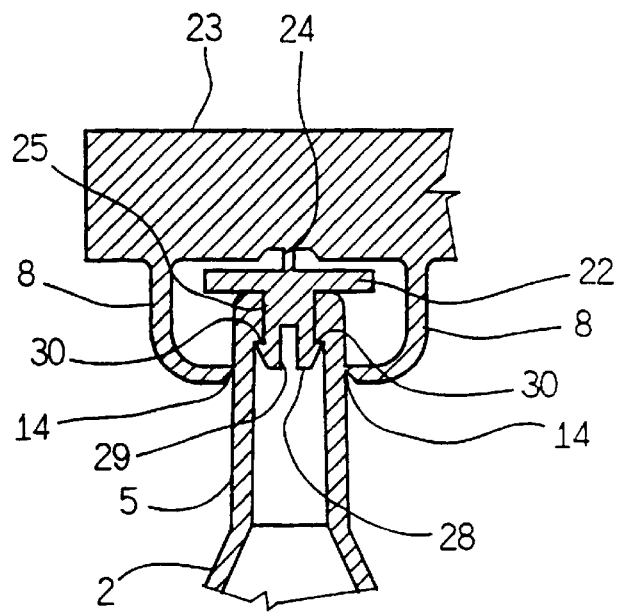
FIG. 53 is an enlarged-scale sectional view of a detail of a container of FIG. 50 before the insertion of the plug means in the mouth of the container.
Figure 54:
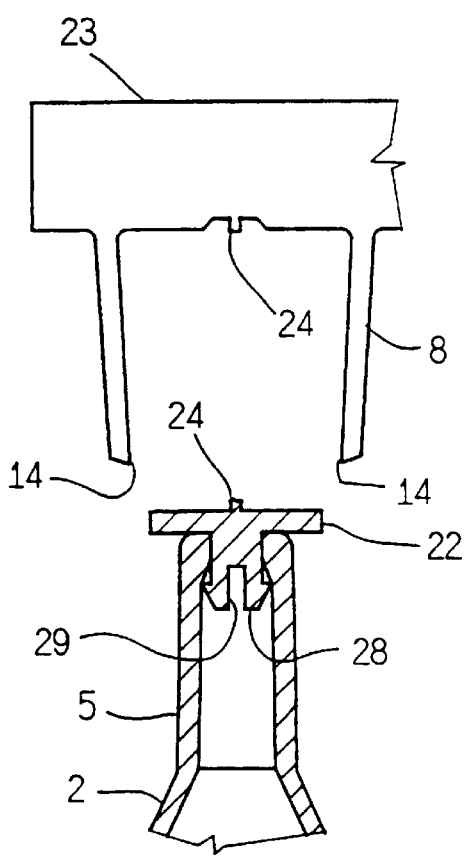
FIG. 54 is an enlarged-scale sectional view of a detail, similar to FIG. 53, but with the plug means inserted in the mouth of the container.
Figure 55:
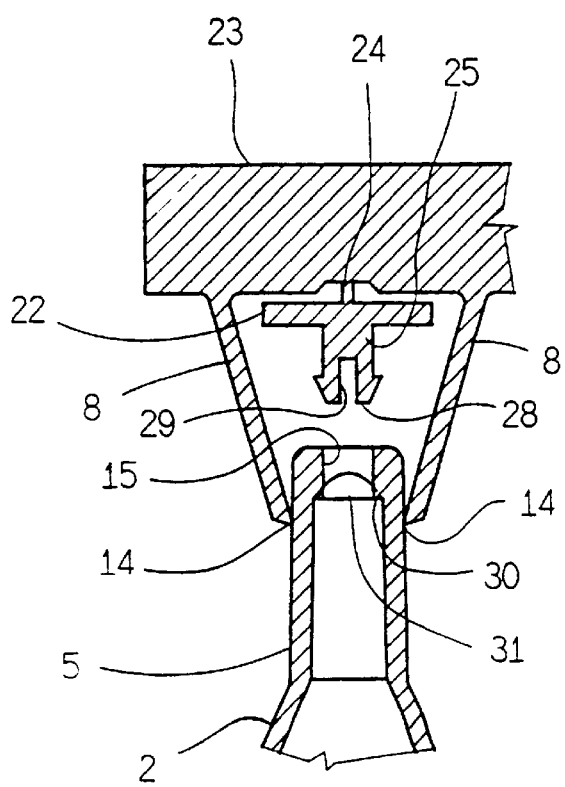
FIG. 55 is an enlarged-scale but nonsectional view, similar to the one of FIG. 54, illustrating the operation for opening said container.

FIGS. 1 to 6, which relate to a first embodiment of the container according to the present invention, illustrate a plurality of containers 1 according to the invention, in the form of a pack of vials made of plastic material fit for thermal bonding. The containers 1 have, at an intermediate distance between the respective ends, connecting flaps 3 which are mutually joined along prefracture lines 9. The flaps of the end containers 1 of the pack of vials are provided, at their end facing outward with respect to the pack, with expansions 12a which act as a sort of bumper to prevent the overlap of consecutive packs of vials during their handling in machines for filling the vials and for packaging the packs. Each container ends with a neck 5 having a dispensing mouth 15 which can be plugged by a closure device constituted by a handle 4, for example shaped like a hollow prism, which is connected to the neck 5 of the container by means of deformable straps 8 which are fixed to said neck along prefracture lines 14. Plug means 6 protrude on the side of the handle 4 which is directed towards the mouth 15 and are provided with an annular expansion 6a which is adapted to enter with a tight fit the mouth 15 of the container 1.

In the bottom of the handle 4 there are provided through slots 13 (FIG. 2) which are arranged so that the central part 12 of the bottom of the handle 4, from which the closure element 6 protrudes, is connected to the rest of the bottom by means of breakable bridges 7. If the container is produced for example in the form of a pack of vials, the handles 4 of the adjacent containers are mutually connected along prefracture lines 10. The handles 4 of the end containers 1 of the pack of vials are provided, at their end directed towards the outside of the pack, with expansions 11 which act as bumpers like the expansions 12a.

The containers 1 are produced, for example by injection-molding, monolithically with the closure device. At the end of the molding operation, the end of the container which lies opposite to the neck 5 is open in order to allow the subsequent filling of the container. The plug means 6, at the end of the molding operation, and in any case whilst the straps 8 are in a nondeformed configuration, are furthermore arranged outside the mouth 15 of the container.

Figures 58, 59:
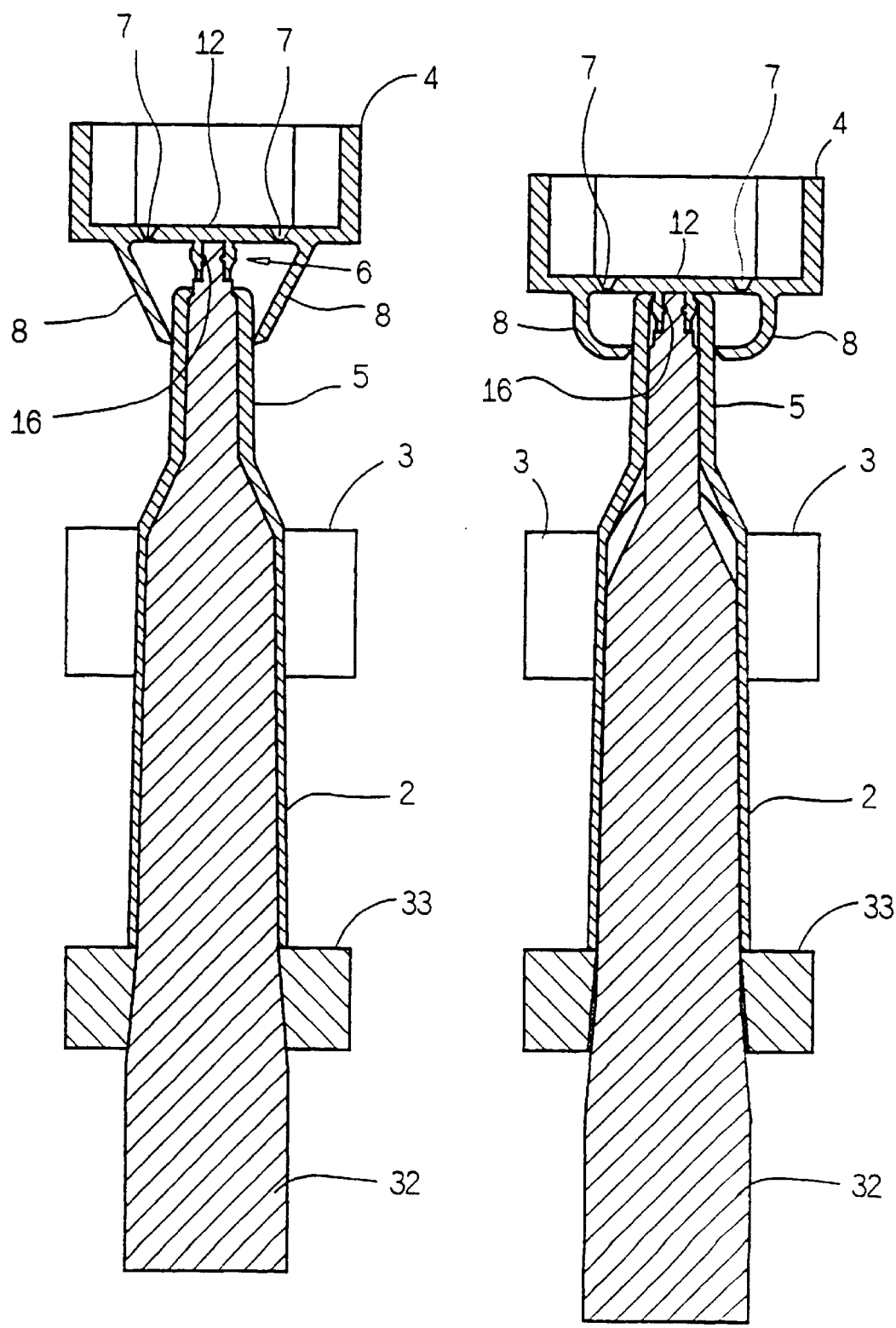
FIG. 58 is a sectional view of a container according to the invention during formation, illustrating the core for forming the container body.
FIG. 59 is a view of the extraction of the core from the body of the container, with simultaneous insertion of the plug means in the mouth of the container, after formation of the container according to the invention.

The plug means 6 can be inserted in the mouth 15 of the container 1 during the extraction of the container from the mold (see FIGS. 58 and 59 in this regard), using the core 32 for forming the body 2 of the container.

For this purpose, the core 32 provided with a tab for providing, in the plug means 6, a cavity 17 (FIG. 4) which is open outward; said tab is provided with a groove for forming, in said cavity 17, an annular protrusion 16 which is coupled to said groove. At the end of the molding operation, the core 32, whilst it is being extracted from the container 1, pulls the plug means 6 along with it, owing to the coupling with the annular protrusion 17, into the mouth 15 of the container 1 until the bottom of the handle 4 abuts against the mouth 15 of the container. At this point, the core 32 disengages from the annular protrusion 17 and can be extracted fully from the body 2 of the container 1, whilst the plug means 6 remain inserted in the mouth 15. As an alternative, the plug means 6 can be forced into the mouth 15, by applying to the handle 4 a thrust which is directed towards the container 2. In this case, the cavity 17 of the closure element 6 does not have the annular protrusion 16, so that it is possible to extract the molding core 32 without the plug means 6 being pulled along with it.

Figures 60, 61:
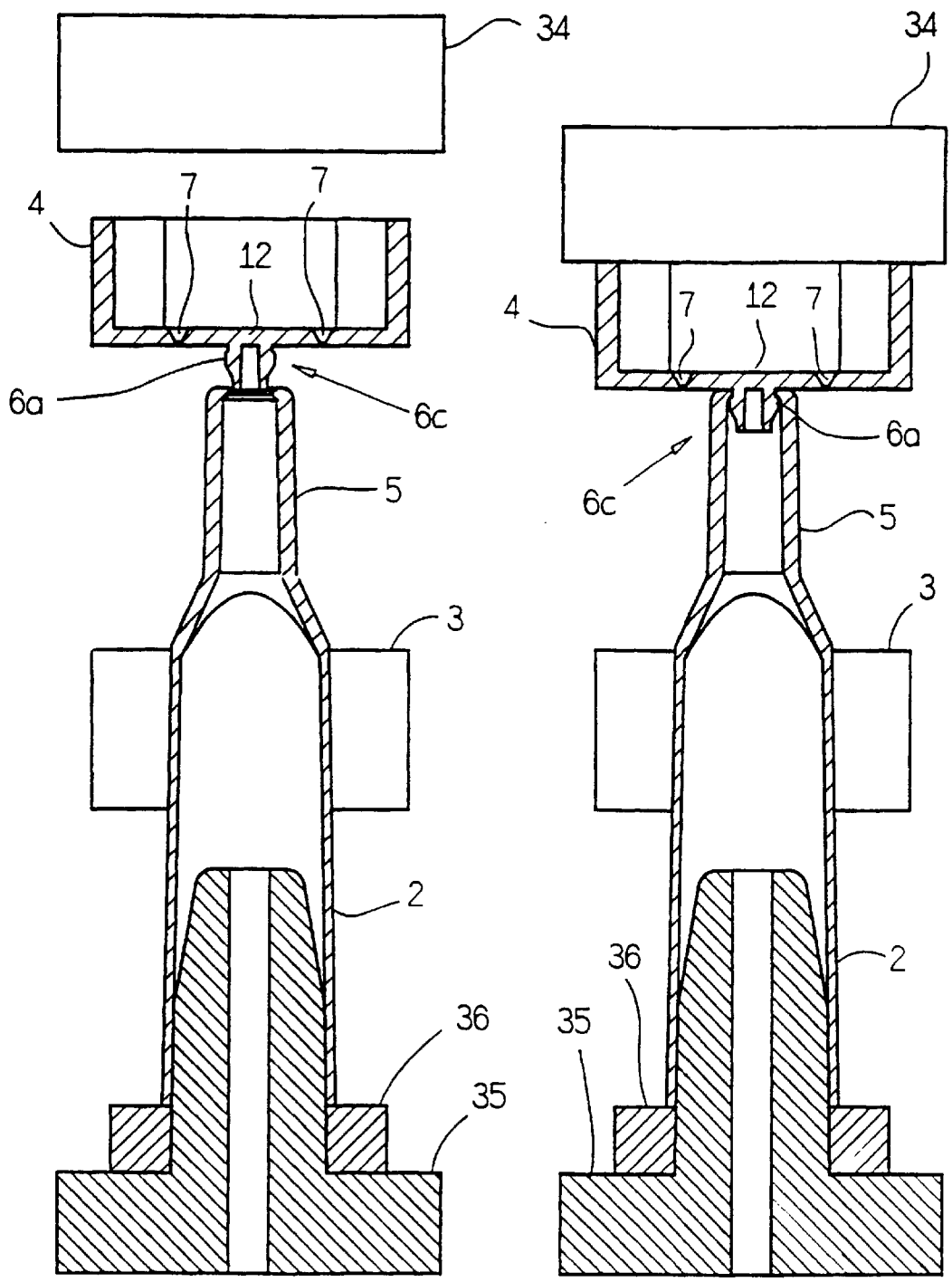
FIGS. 60 and 61 are views of another method for inserting the plug means in the mouth of the container after forming the container in a mold.
Figure 62:
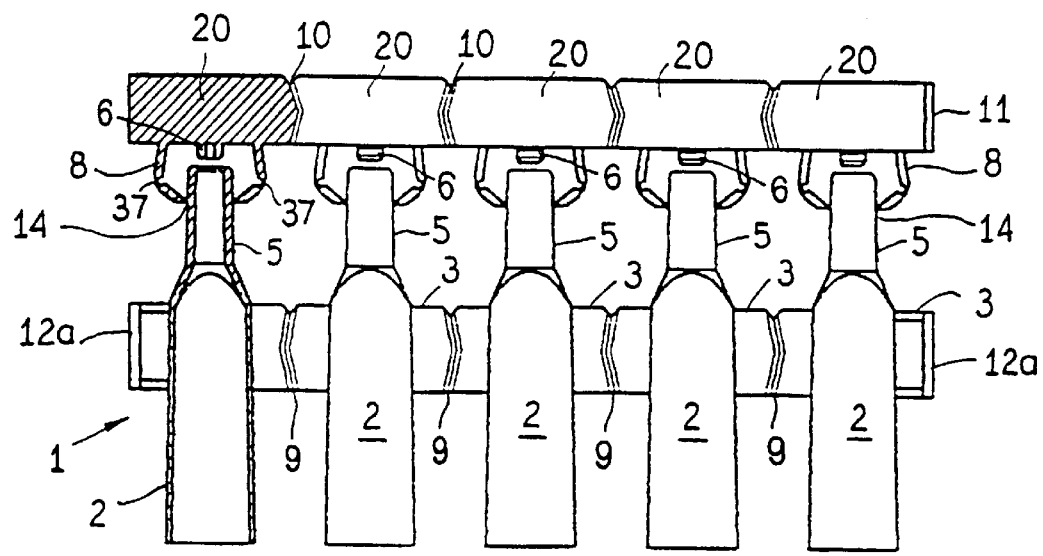
FIG. 62 is a partially sectional view of a plurality of containers according to a tenth embodiment of the present invention, for example, a pack of containers in vial form, before insertion of the plug means in the respective mouths of the containers.
Figure 63:
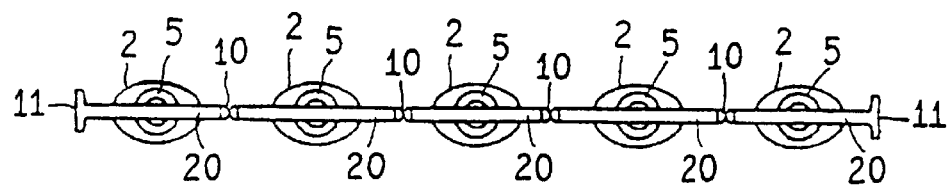
FIG. 63 is a top view of FIG. 62.
Figure 64:
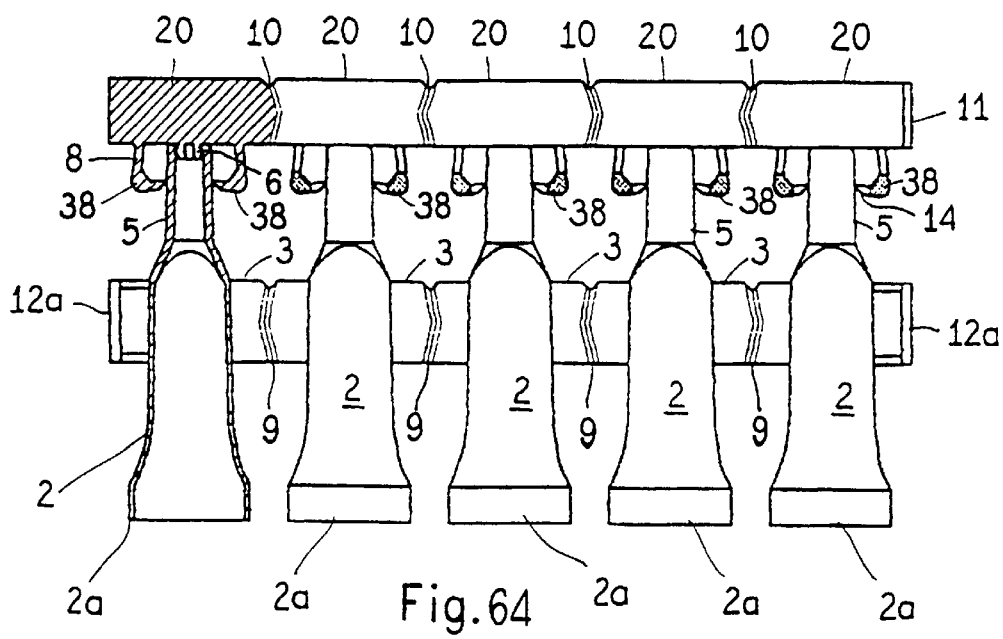
FIG. 64 is a view, similar to that of FIG. 62, with the plug means inserted in the respective mouths of the containers.
Figure 65:
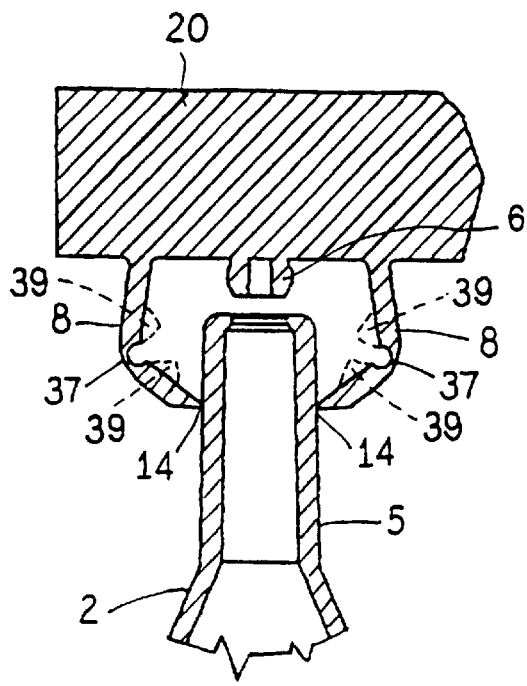
FIG. 65 is an enlarged-scale sectional view of a detail of a container of FIG. 62 before insertion of the plug means in the mouth of the container.
Figure 66:
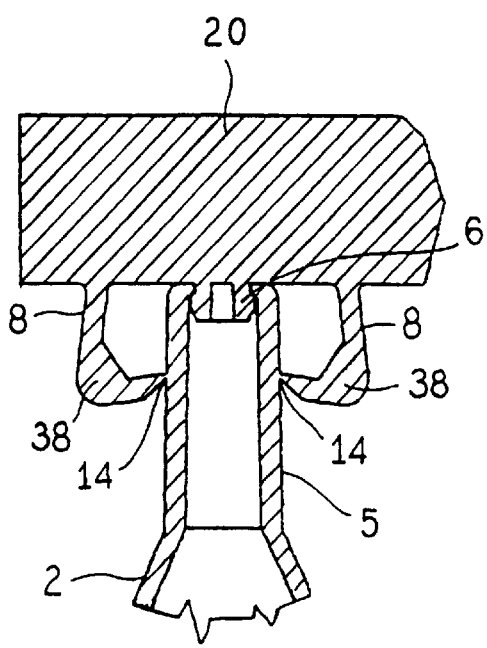
FIG. 66 is an enlarged-scale sectional view of a detail similar to that of FIG. 65, but with the plug means inserted in the mouth of the container.
Figure 67:
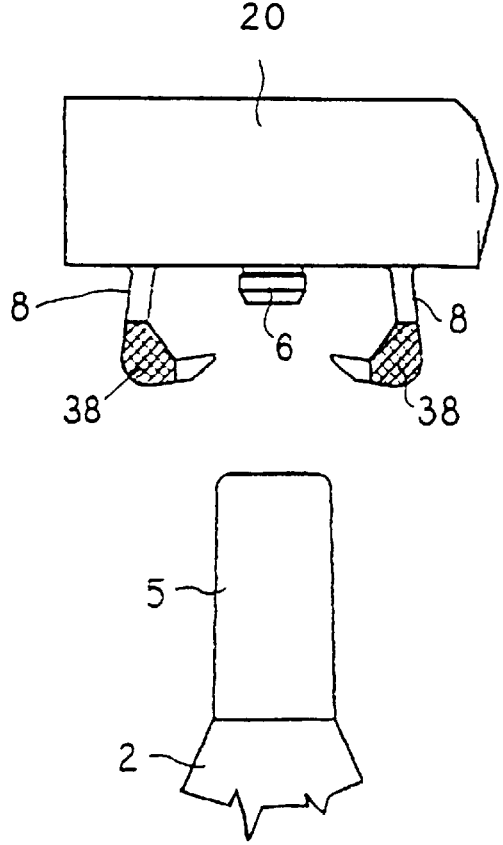
FIG. 67 is an enlarged-scale nonsectional view of a detail similar to that of FIG. 66, illustrating the opening operation of the container.

The plug means 6 can be inserted in the mouth 15 of the container 1 after drawing the container 1 from the mold, simultaneously with the checking of the presence of any microscopic holes or leaks in the container (see FIGS. 60 and 61 in this regard).

For this purpose, the open end of the container 1 is inserted with a tight fit on an air injector 35, with a sealing gasket 36 interposed between the bottom of the container 1 and the injector. Once the insertion of the container 1 on the injector 35 has been completed, a presser 34 pushes the handle 4 towards the container 1, forcing the plug means 6 inside the mouth 15 of the container; then pressurized air is fed into the container 1 in order to detect any microscopic holes or leaks.

Once checking for any microscopic holes or leaks has been completed, the container 1 can be filled with the substance which it is meant to contain and finally the open end of the container is joined, for example heat-sealed, along a bonding line 2a. The container is thus ready for packaging and for sale to the end user.

During the insertion of the plug means 6 in the mouth 15 of the container, the straps 8 bend (FIG. 3) without however separating from the neck 5 of the container.

The straps 8 act as tamper-evident seals, since any breakage thereof indicates that the container has been tampered with. In order to open the container it is sufficient to pull and optionally twist the handle 4 so as to break the bridges 7 and separate the straps 8 from the neck 5 (FIG. 6) and finally extract the plug means 6 from the mouth 15, gripping the central part 12 of the bottom of the handle 4, which has separated from said handle owing to the breakage of the bridges 7.

FIGS. 7 to 12 illustrate a second embodiment of the container according to the invention. In this embodiment, the plug means 6b are given such dimensions that at the end of the molding operation, and in any case whilst the straps 8 are in a nondeformed configuration, they are partially inserted in the mouth 15 of the container 1. The plug means 6b can furthermore be optionally connected to the mouth 15 of the container 1 through breakable bridges or along a prefracture line. Finally, the handle 4 is provided with a continuous bottom 19, i.e., a bottom without detachable parts.

The formation of the container 1 and the insertion of the plug means 6b in the mouth 15 of the container occur as described above.

The fact that the plug means 6b are partially inserted in the mouth 15 of the container 1 when the straps 8 are in the nondeformed configuration makes it impossible to extract the plug means 6b from the mouth 15 of the container 1 without causing the separation of the straps 8 from the neck 5.

In order to open the container 1, it is sufficient to pull the handle 4 of the closure device, thus causing the separation of the straps 8 from the neck 5 of the container and the simultaneous extraction of the plug means 6b from the mouth 15.

FIGS. 13 to 18 illustrate a third embodiment of the container according to the invention. In this embodiment, the device for closing the container 1 does not have the straps 8. Furthermore, when molding ends, the end of the plug means 6c which is directed towards the container is at the level of the mouth 15 and is connected thereto by means of breakable bridges or along a prefracture line. Finally, the handle 4 of the closure device is provided with a bottom which has a detachable central part 12, as in the first embodiment illustrated in FIGS. 1 to 6.

The insertion of the plug means 6c in the mouth 15 occurs as described above, preferably by pushing the handle 4.

In order to open the container, it is sufficient to pull, and optionally twist, the handle 4 so as to break the bridges 7 (FIG. 18) and finally extract the plug means 6c from the mouth 15, gripping the central part 12 of the bottom of the handle 4, which has separated from said handle owing to the breakage of the bridges 7.

FIGS. 19 to 24 illustrate a fourth embodiment of the container according to the invention.

This embodiment is similar to the second embodiment shown in FIGS. 7 to 12, from which it differs only in that the closure device is provided with plug means 6c, whose end directed towards the container, at the end of the molding operation, is connected to the mouth 15 by means of breakable bridges or along a prefracture line.

FIGS. 25 to 30 illustrate a fifth embodiment of the container according to the invention, in which the handle of the closure device is constituted by a flap 20 from the lower end of which the straps 8 and the plug means 6, 6b or 6c extend.

The closure of the container 1, after molding it, can occur as described above with reference to FIGS. 1 to 6, preferably by applying to the flap 20 a thrust which is directed towards the container.

In order to open the container at the time of use, it is sufficient to pull the flap 20 (see FIG. 30), separating the straps 8 from the neck 5 of the container 1 and extracting the plug means 6, 6b, and 6c from the mouth 15.

FIGS. 31 to 36 illustrate a sixth embodiment of the container according to the invention, which is particularly adapted for the case of containers 1 provided in the form of a pack of vials.

In this embodiment, the plug means 21 of each container 1 are provided, in an upward region, with an expansion 22 which is for example disk-shaped and is transversely larger than the neck 5 of the container. The expansion 22 has, on the opposite side with respect to the plug means 21, at least one connecting tab 24 which is fixed to a flap 23 which mutually connects all the connecting tabs 24 of the containers of the pack.

During formation, the plug means 21 are connected to the mouth 15 of the respective container 1 through breakable bridges 18 or along a prefracture line 18a.

In order to close the containers 1 of the pack after forming them, it is sufficient to apply to the flap 23 a thrust towards the container, causing the tight-fit insertion of the plug means 21 in the respective mouths 15 of the containers 1 after breaking the bridges 18 or the prefracture line 18a.

In order to open a container 1, it is separated from the pack, detaching it from the adjacent container along the prefracture line 9 and breaking the tab 24 in order to separate it from the flap 23; finally, the plug means 21 are extracted by pulling the expansion 22.

FIGS. 37 to 42 illustrate a seventh embodiment of the container according to the invention, which is also particularly adapted for the case of containers 1 made in the form of a pack of vials.

This embodiment differs from the preceding one in that pairs of straps 8 extend from the flap 23 at each container 1 and are fixed to the neck 5 of the respective container 1 along prefracture lines 14.

The plug means 21b, similar to the plug means 6b, furthermore have such dimensions that at the end of the molding operation, and in any case whilst the straps 8 are in a nondeformed configuration, they are partially inserted in the mouth 15 of the container 2.

The straps 8 act as a tamper-evident seal, since if one attempts to extract the plug means 21b from the respective containers 1 after they have been inserted with a tight fit in the mouth 15 of said containers, the straps 8 separate.

FIGS. 43 to 49 illustrate an eighth embodiment of the container 1 according to the invention. This embodiment is similar to the third one, illustrated in FIGS. 13 to 18, and differs from it only in that the handle of the closure device is provided in the form of a flap 20.

FIGS. 50 to 57 illustrate a ninth embodiment of the container according to the invention, which is also particularly adapted for the case of containers 1 provided in the form of a pack of vials.

In this embodiment, the plug means 25 of each container 1 are provided, in an upward region, with an expansion 22, 22a which is for example disk-shaped and is connected, by means of at least one connecting tab 24, to a flap 23 which mutually connects all the plug means of the containers that constitute the pack.

The plug means 25 are constituted by a cylindrical body which ends, at the tip directed towards the container 1, with a pair of wedge-shaped protrusions 28 separated by a groove 29. Inside the neck 5 of the container there are provided two mutually opposite protrusions 30, shaped like an annular sector, and two conical surface portions 31, which are mutually opposite and offset by 90° with respect to the protrusions 30. The taper of said conical surface portions is directed towards the mouth 15 of the container 1.

Upon insertion in the mouth 15 of the container 1, the plug means 25 are arranged so that the protrusions 28 couple, by engagement in an undercut, with the protrusions 30 inside the neck 5: in this manner, the plug means 25 cannot be extracted from the mouth 15 by simply pulling.

In a first variation of the present embodiment of the container 1, pairs of straps 8 extend from the flap 23 at each container 1 and are fixed to the neck 5 of the respective container 1 along prefracture lines 14.

In a second variation of the present embodiment, pairs of straps 26 fixed to the neck 5 of the respective container 1 along prefracture lines 27 extend from each expansion 22a of the respective plug means.

Figure 56:
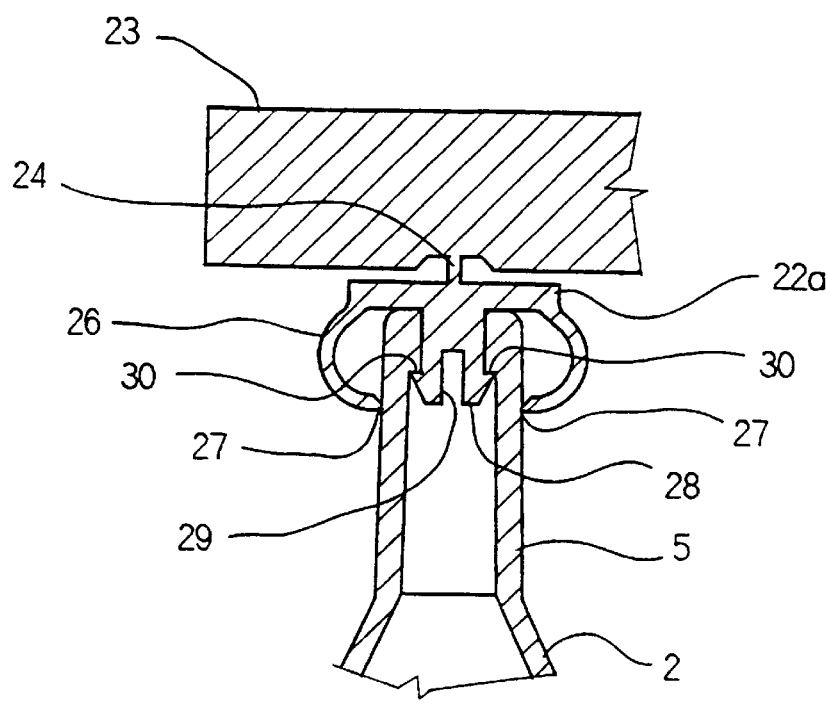
FIG. 56 is a view of a detail, similar to the one of FIG. 54, but related to the different embodiment shown in the right part of FIG. 50.
Figure 57:
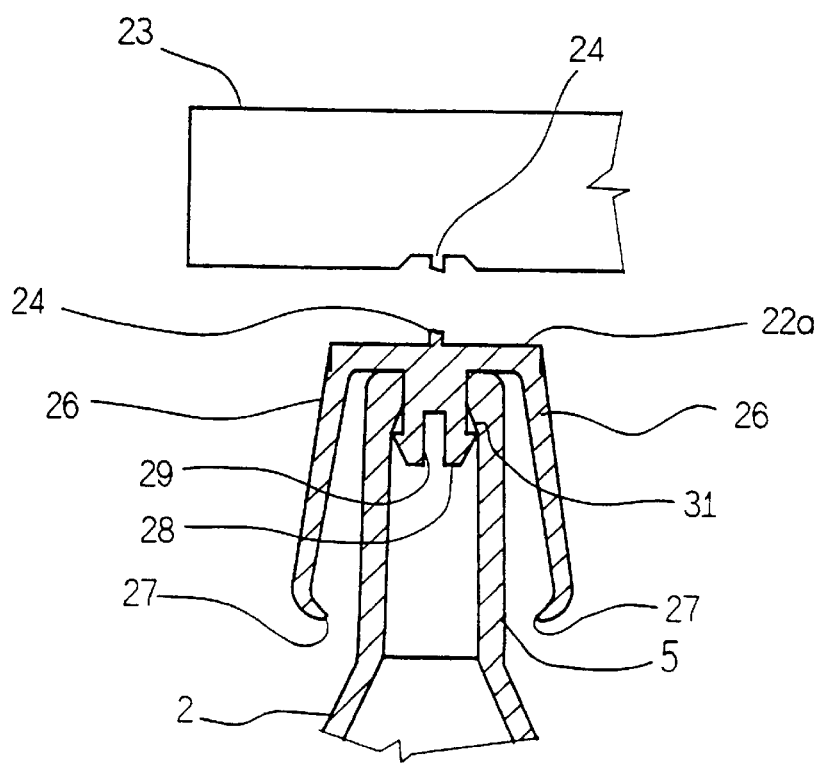
FIG. 57 is a view of a detail similar to the one of FIG. 56, illustrating the operation for opening the container.

In order to insert the plug means 25 in the mouths 15 of the respective containers 1 after the formation of the pack of containers it is sufficient to push the flap, 23 towards the containers 2. Through said pushing action, the protrusions 28 of the plug means 25 deform, moving mutually closer by means of the presence of the groove 29, and can thus be inserted in the mouth 15 and pushed inside the neck 5 until they couple, by engagement in an undercut, to the respective protrusions 30 (FIG. 56).

In order to extract the plug means 25 from the mouth 15 of the container 1, it is first of all necessary to separate the container from the adjacent one, detaching it from said adjacent container along the prefracture line 9, and to break the tab 24, in order to detach the container from the flap 23. Then the plug means 25 are rotated through 900°, causing the separation of the straps 8 and 26 and placing the protrusions 28 at the conical surface portions 31. At this point the plug means 25 can be extracted by pulling the expansion 22, 22a and by sliding the protrusions 28 along said conical surface until the plug means 25 are extracted from the mouth 15 of the container.

FIGS. 62 to 65 illustrate a tenth embodiment of the container according to the invention, wherein the deformable straps 8 have, in an intermediate position, respective recesses 37.

During insertion of the plug means 6 into the container mouth 15, the recesses 37 create localized deformation zones allowing the straps 8 to bend more easily by avoiding detaching from the container neck 5.

Thereafter in the localized deformation zones 37, blocking elements 38 are inserted, as for example weld facing material.

Furthermore, in proximity to the recesses 37, the straps 8 can advantageously have sectional thickenings 39 so as to facilitate, by material addition, the welding operations 38.

Figures 68, 69:
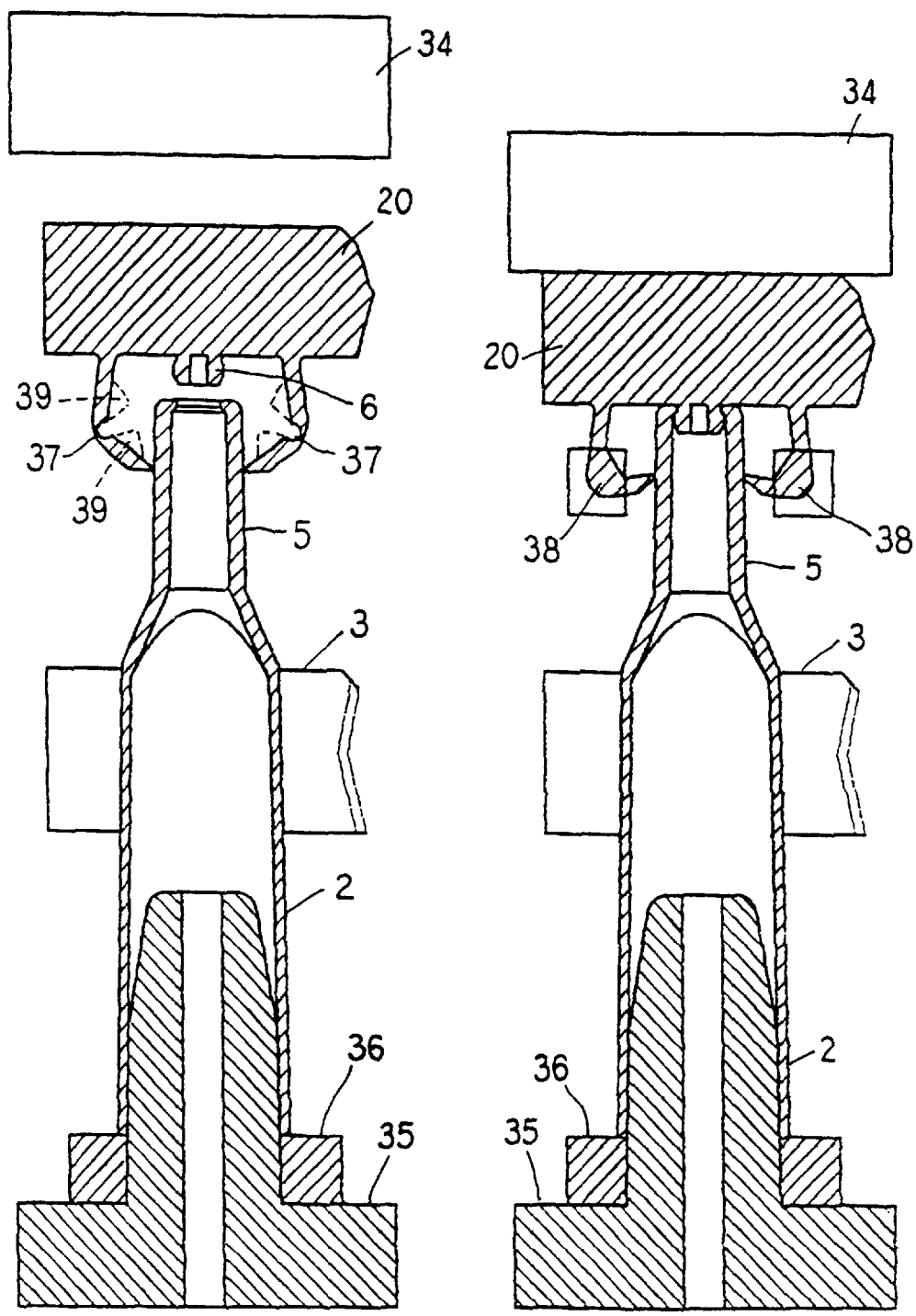
FIGS. 68 and 69 illustrate the manner in which the plug means are inserted in the mouth of the container of FIGS. 60 and 61, with a different embodiment of the tearing elements.

The blocking element 38 inserting operation can be carried out, after the container 1 is drawn out from the forming mold, at the same time with the checking of the presence of possible leaks and microscopical holes in the container (FIGS. 68 and 69).

The presence of the blocking elements 38 renders the straps 8 rigid and so acts as a further tamper-evident seal, inasmuch, by preventing any elastic deformation, does not allow the container to be tampered, without blocking the straps 8.

In practical execution, the materials, the dimensions and the construction details may be different from those specified but technically equivalent thereto thereby being still comprised within the scope of the appended claims. from the mouth 15 of the container.

FIGS. 62 to 65 illustrate a tenth embodiment of the container according to the invention, wherein the deformable flaps 8 have, in an intermediate position, respective recesses 37.

During insertion of the plug means 6 into the container mouth 15, the recesses 37 create localized deformation zones allowing the flaps 8 to bend more easily by avoiding detaching from the container neck 5.

Thereafter in the localized deformation zones 37, blocking elements 38 are inserted, as for example weld facing material.

Furthermore, in proximity to the recesses 37, the flaps straps 8 can advantageously have sectional thickenings 39 so as to facilitate, by material addition, the welding operations 38.

The blocking element 38 inserting operation can be carried out, after the container 1 is drawn out from the forming mold, at the same time with the checking of the presence of possible leaks and microscopical holes in the container (FIGS. 68 and 69).

The presence of the blocking elements 38 renders the flaps 8 rigid and so acts as a further tamper-evident seal, inasmuch, by preventing any elastic deformation, does not allow the container to be tampered, without blocking the straps 8.

In practical execution, the materials, the dimensions and the construction details may be different from those specified but technically equivalent thereto without thereby abandoning the juridical domain of the present invention.

What is claimed is:

1. A container comprising: a longitudinally extending hollow body provided with a dispensing mouth; closure means having a substantially transversely extending zone from which plug means for said mouth extend on the part of the closure means which is directed towards the mouth; and tearing elements provided for connecting uninterruptedly said closure means with said container, wherein said closure means comprise a handle having at a bottom thereof a detachable central part which is connected to the handle bottom through breakable bridges, said plug means extending from said central part.

2. The container of claim 1, wherein said plug means are coupled to said mouth to close the container.

3. The container of claim 2, wherein said plug means are coupled to close the container, on an inner surface of said mouth.

4. The container of claim 1, wherein said plug means are provided with an annular expansion which is adapted to enter with a tight fit the mouth of the container.

5. The container of claim 4, wherein said plug means comprise a cavity which is open outwards and an annular protrusion provided inside said in said cavity.

6. The container of claim 1, wherein said handle is shaped as a hollow prism.

7. The container of claim 6, wherein said breakable bridges are provided so as to break upon acting on said handle by any of a pulling off and twisting action.

8. The container of claim 1, further comprising connecting flaps protruding at said body, between opposite ends thereof, each one of said connecting flaps being joined, along a respective prefracture line, to a corresponding flap of a container arranged adjacent thereto, whereby a pack of mutually joined containers is formed.

9. The container of claim 8, wherein the handle of the closure means is connected along a handle prefracture line to a corresponding handle of the container arranged adjacent thereto.

10. The container of claim 9, wherein the handle of the closure means is joined to the handle of the adjacent container so as to form a single body handle for all the containers in the pack, said plug means of the containers being all connected to said single body handle.

11. The container of claim 1, wherein said plug means are constituted by a substantially cylindrical body which comprises, at a tip directed towards the container, a pair of plug protrusions separated by a groove.

12. The container of claim 11, further comprising: two mutually opposite engagement protrusions located inside a neck part thereof and shaped as an annular sector, said engagement protrusions being arranged so as to engage said plug protrusions; and two conical surface portions which are mutually opposite and offset by 90° with respect to said engagement protrusions, said conical surface portions being tapered towards said mouth.

13. The container of claim 12, wherein said plug means are connected to the neck part of the container through deformable connecting means which are fixed to said neck part along prefracture lines.

14. The container of claim 1, further comprising deformable connecting means which are fixed to said neck along prefracture lines, said handle being detachably connected to a neck of said body through said deformable connecting means.

15. The container of claim 14, wherein said plug means are arranged outside the mouth of the container with said connecting means being in a nondeformed configuration.

16. The container of claim 14, wherein said plug means are partially inserted in the mouth of the container with said connecting means being in a nondeformed configuration.

17. The container of claim 14, being molded with said plug means detachably connected to the mouth thereof through any of a plug breakable bridge and a plug prefracture line.

18. A closure device made monolithically with a container as set forth in claim 1, the closure device comprising: a handle; and plug means extending from said handle at the side thereof facing the mouth of the container to close said container at said mouth, said handle comprising a bottom region having a central part and a peripheral part, said central part being connected to the peripheral part through breakable bridges, said plug means extending from said central part of the bottom region.

19. The closure device of claim 18, comprising connecting means for detachable connection, along prefracture lines, to the body of the container.

20. The closure device of claim 19, wherein said connecting means have in an intermediate position thereof recesses forming localized deformation zones, said recesses allowing easy bending of said connection means at insertion of the plug means in the container mouth.

21. The closure device of claim 20, further comprising blocking elements provided at an intermediate position of said connecting means, said blocking elements being adapted to render rigid said connecting means whereby to act as a tamper-evident seal.

22. The closure device of claim 21, wherein said connecting elements comprise, provided at said recesses, sectional thickenings which allow material addition by welding to form said blocking elements.

* * * * *